(12) United States Patent
Bronson et al.

(10) Patent No.: US 6,228,664 B1
(45) Date of Patent: May 8, 2001

(54) CALIBRATION METHOD FOR RADIATION SPECTROSCOPY

(75) Inventors: Frazier Bronson, Middletown, CT (US); Valerii V. Atrashkevich, Moscow (RU)

(73) Assignee: Canberra Industries, Inc., Meriden, CT (US)

( * ) Notice: Subject to any disclaimer, the term of this patent is extended or adjusted under 35 U.S.C. 154(b) by 0 days.

(21) Appl. No.: 09/355,668
(22) PCT Filed: Feb. 13, 1998
(86) PCT No.: PCT/US98/02664
  § 371 Date: Jul. 27, 1999
  § 102(e) Date: Jul. 27, 1999
(87) PCT Pub. No.: WO98/39628
  PCT Pub. Date: Sep. 11, 1998

Related U.S. Application Data
(60) Provisional application No. 60/039,699, filed on Feb. 13, 1997.

(51) Int. Cl.[7] .............................. G01R 31/26; G01T 1/167
(52) U.S. Cl. ................. 438/14; 250/252.1; 250/363.09; 250/308; 702/8
(58) Field of Search .................... 702/8, 23, 38, 702/47, 49, 85, 104, 134, 127; 250/252.1, 299–300, 308, 261, 328; 378/19, 98.8–98.9; 438/14

(56) References Cited

U.S. PATENT DOCUMENTS
5,095,217 * 3/1992 Attix ........................ 250/374
5,541,415 * 7/1996 Shonka ...................... 250/374

* cited by examiner

*Primary Examiner*—Jey Tsai
(74) *Attorney, Agent, or Firm*—John H. Crozier

(57) ABSTRACT

A method of calibrating and using a radiation detector to quantify the radioactivity in or on a wide variety of objects, over a wide range of object sizes (points to hundreds of cubic meters), over a wide range of energies (e.g., 50–7000 keV photons), where the object can be at any location in a large sphere (e.g. 100 meter diameter) surrounding the detector, and where there can be various absorbers between the radioactive object and the detector (e.g., container, walls, air collimators), in which calibrations have been implemented and expanded following the method of Atrashkevich and Kolotov but without the use of radioactive sources and in minutes, and with no generation of radioactive waste. Such calibration technique can be applied to the quantiative analysis of a spectrum of radioactivity taken from a wide variety of in-situ or laboratory samples.

12 Claims, 13 Drawing Sheets

Efficiency integration inside a layer  $[\ F(x,y,z) = fvac(x,y,z)*fatt(x,y,z)*fcol(x,y,z)\ ]$

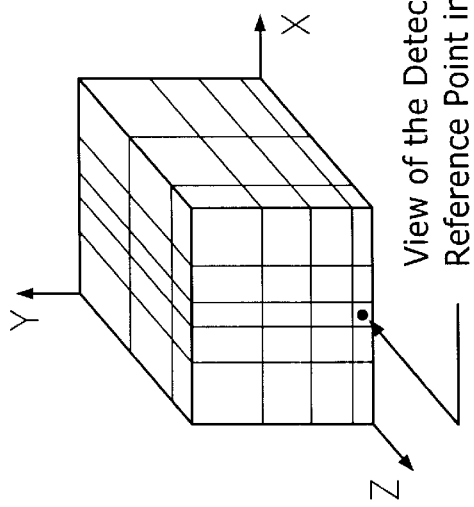

View of the Detector Reference Point in a Parallelopipedon Shape $$Ic = \sum_{i=0}^{m} \sum_{j=0}^{m} \sum_{k=0}^{m} Ai*Aj*Ak* F(X0+i*dx, Y0+j*dy, Z0+k*dz)*dx*dy*dz \quad \text{'m' points quadrature method} \quad I - Ic \sim \Delta V^{m+1} * F^{(m)} / 2^{m+1}$$

$$Ic = \frac{V}{N} \sum_{i=1}^{m} F[e_i(X,Y,Z)] \quad \text{ordinary Monte-Carlo method} \quad I - Ic \sim \Delta V^2 * F'/N^{1/2}$$

$$Ic = \frac{V}{N} \sum_{i=1}^{m} F[e_i(X,Y,Z)] \quad \text{Monte-Carlo method with determinate sequence(LP}\gamma\text{)} \quad I - Ic \sim \Delta V^2 * F'/N$$

FIG. 3A

Efficiency integration inside a layer $[F(x,y,z) = fvac(x,y,z)*fatt(x,y,z)*fcol(x,y,z)]$

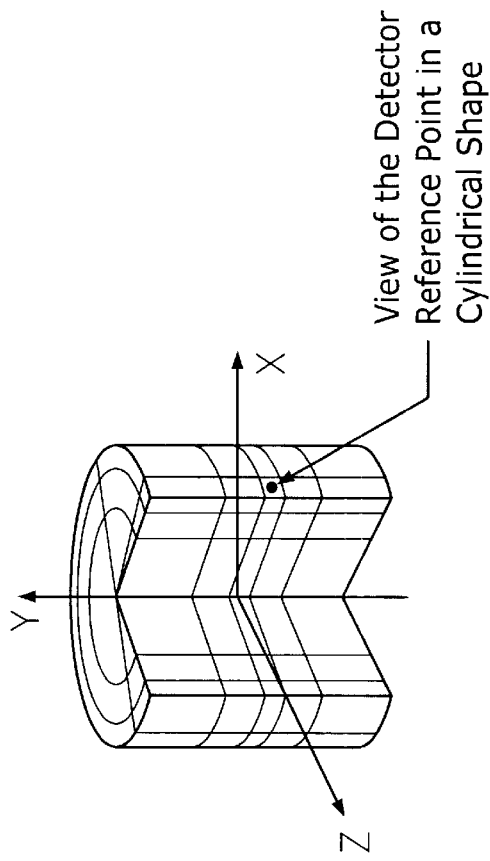

View of the Detector Reference Point in a Cylindrical Shape $$Ic = \sum_{i=0}^{m}\sum_{j=0}^{m}\sum_{k=0}^{m} Ai*Aj*Ak* F(X0+i*dx, Yo+j*dy, Zo+k*dz)*dx*dy*dz$$

'm' points quadrature method $\quad I - Ic \sim \Delta V^{m+1} * F^{(m)}/2^{m+1}$ $$Ic = \frac{V}{N}\sum_{i=1}^{m} F[e_i(X,Y,Z)]$$

ordinary Monte-Carlo method $\quad I - Ic \sim \Delta V^2 * F'/N^{1/2}$ $$Ic = \frac{V}{N}\sum_{i=1}^{m} F[e_i(X,Y,Z)]$$

Monte-Carlo method with determinate sequence(LP$\tau$)
$\quad I - Ic \sim \Delta V^2 * F'/N$

FIG. 3B

Efficiency integration inside a layer    [ F(x,y,z) = fvac(x,y,z)*fatt(x,y,z)*fcol(x,y,z) ]

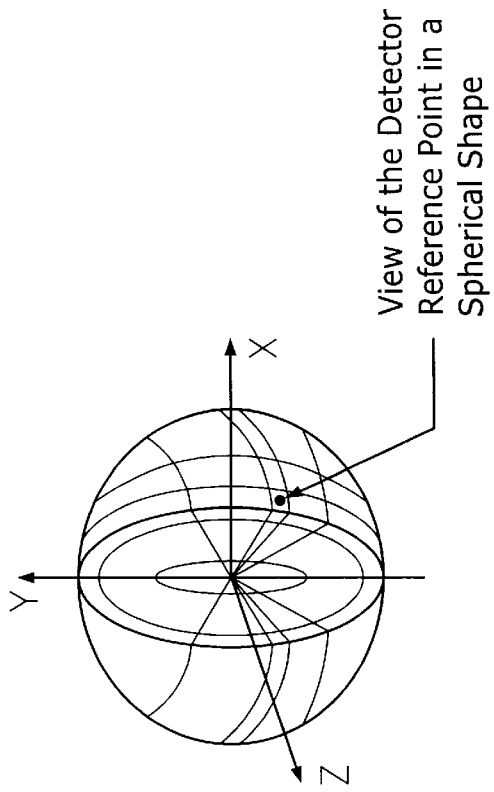

View of the Detector Reference Point in a Spherical Shape $$Ic = \sum_{i=0}^{m} \sum_{j=0}^{m} \sum_{k=0}^{m} Ai*Aj*Ak* F(X0+i*dx, Yo+j*dy, Zo+k*dz)*dx*dy*dz$$

'm' points quadrature method    $I - Ic \sim \Delta V^{m+1} * F^{(m)}/2^{m+1}$ $$Ic = \frac{V}{N} \sum_{i=1}^{m} F[e_i(X,Y,Z)]$$

ordinary Monte-Carlo method    $I - Ic \sim \Delta V^2 * F'/N^{1/2}$ $$Ic = \frac{V}{N} \sum_{i=1}^{m} F[e_i(X,Y,Z)]$$

Monte-Carlo method with determinate sequence(LPτ)    $I - Ic \sim \Delta V^2 * F'/N$

FIG. 3C

Pathway (L) computation for the different geometry shapes used by ISOCS

$$L = [(\Delta X)^2 + (\Delta Y)^2 + (\Delta Z)^2]^{1/2}$$

Equation System to be Solved $$X^2 + Y^2 + Z^2 - R^2 = 0$$
$$(X-x1)/(x2-x1) = (Y-y1)/(y2-y1) = (Z-z1)/(z2-z1)$$

Spherical Shape

Pathway (L) computation for the different geometry shapes used by ISOCS

$$L = [(\Delta X)^2 + (\Delta Y)^2 + (\Delta Z)^2]^{1/2}$$

Equation System to be Solved $Z = 0$
$Z = h$
$X^2 + Y^2 - Z^2 / R^2 = 0$
$(X-x1)/(x2-x1) = (Y-y1)/(y2-y1) = (Z-z1)/(z2-z1)$ Truncated Conical Shape

CALIBRATION METHOD FOR RADIATION SPECTROSCOPY

CROSS-REFERENCE TO RELATED APPLICATIONS

The present application claims the benefit of Patent Cooperation Treaty Application No. PCT/US98/02664, filed Feb. 13, 1998, now WO 98/39628 which claims the benefit of U.S. Provisional Patent Application Ser. No. 60/039,699, filed Feb. 13, 1997.

TECHNICAL FIELD

The present invention relates to a highly efficient method for calibrating radiation detectors which method does not require the use of any radioactive sources.

BACKGROUND ART

Radiation detector systems and germanium detector systems, in particular, are generally efficiency calibrated using radioactive standards that resemble the actual samples as closely as possible in terms of size, shape, composition, and relative position between the detector and the sample (the source-detector geometry).

Gamma spectroscopy systems use a variety of detector types. Common types are NaI(Tl) and Ge. These detector systems are generally calibrated for energy vs. efficiency using radioactive standards that resemble the actual samples as closely as possible in terms of size, shape, composition, and relative position between the detector and the sample [the source-detector geometry].

In the laboratory application, samples are placed in containers and measured. But since most laboratories use many different types of sample containers, and may also use each one of them at several detector-to-sample distances, and generally many different sample matrix compositions, the efficiency calibration is both an expensive and a time consuming task.

But, in many environmental and other situations, the object to be measured are generally large. The most common current method is to take small samples of these large objects, and assay them in the standardized and calibrated geometries at the laboratory. But this both expensive and time consuming since it involves collecting the sample, packaging it, transporting it to the laboratory, preparing the sample, and finally assaying it. Furthermore, there is always the question of how representative the samples are of the larger object and how to deal with large solid objects that do not lend themselves to sampling. In situ gamma spectroscopy is much more direct; just take the laboratory detector to the object, and assay the entire object. This has the advantage of lower cost for the measurement, and nearly instantaneous results.

But, then the detector must be calibrated for these large objects. Building laboratory sized radioactive calibrations sources is a solvable problem, but building very large ones is very difficult, very expensive, creates radioactive waste, and perhaps not very safe. And, if the sample is in a low efficiency geometry, [e.g. behind a shield, at a far distance, etc.] then the radioactive calibration source must be very "hot", which makes all the previous problems very much greater.

For certain types of measurements, it is very difficult, or impossible to create a standard source that truly mimics the actual sample. Such difficult measurements include very large containers, in which a uniform distribution of the radioactive standard material is very difficult to assure. Another common item to be measured in situ is soil, in which the distribution of the radioactivity of interest is not uniform, but varies exponentially with depth in the soil. This is nearly impossible to mimic using an exact radioactive calibration source. Today, in such cases, the efficiency calibration is commonly created from a series of radioactive standard point source measurements that establish the detector response at various angles between the detector axis and a point source. This angular response is then expanded into an efficiency calibration for a semi-infinite plane at a specific distance from the detector, typically at 1 meter using mathematical integration techniques. This type of calibration methodology has been pioneered by the DOE Environmental Measurement Laboratory (EML) in New York in their various reports and publications. A description of the theory and application can be found in HASL-258 (H. L. Beck et al., USDOE Report HASL-258, 1972) and of the more detailed calibration procedures in HASL-300 (N. A. Chieco et al. (eds.), USDOE Report, HASL-300, 27th edition, Vol. 1, Section 3, 1992). Where a full characterization of a detector is not practical, an approximation may be used (I. K. Helfer and K. M. Miller, Health Physics, 55 (1988) 15).

The EML method is not applicable for close geometries, for non-symmetric geometries, or for complex geometries. Over the years, mathematical methods for calibration in place of measuring radioactive standards have been suggested for some specific cases. The point, line and area approximations and the related calibrations for performing holdup measurements in simplified geometries are described in the NUREG/CR-5550 book (D. Reilly, et. al. (eds.), NUREG/CR-5550, 1991). These methods allow multiple radioactive standard point source measurements to be mathematically integrated to represent line or area sources. However, the approximations made in these methods make them to be of a very limited use for complex shapes. Filss (P. Filss, Appl. Radiat. Isot. 46, (1995) 805) describes a method of using a reference radioactive calibration source, and a mathematical absorption correction to represent a cylindrical waste drum, but his implementation is only applicable to a drum shaped sample.

A general mathematical description of voluminous source activity detection was described by Moens et al in 1981 (L. Moens, et. al., Nucl. Instr. Meth. 187 (1981) 451). However, the method requires detailed detector shape information that is often not available and very long computation times on the computer. To reduce the computational requirements, it has also been suggested that both the sample and the detector be reduced to an effective point with an attenuator in between (M. Noguchi, et. al., Int. J. Appl. Radiat. Isot. 32 (1981) 17). However, this approach still requires a very large number of empirical measurements to establish the effective center of the detector crystal. It also includes many empirical parameters to be determined with good accuracy and that leads to long count times for each of these measurements. Atrashkevich and Kolotov (V. V. Atrashkevich and V. P. Kolotov, J. Radioanal. Nucl. Chem. 169 (1993) 397) have taken this approach further by introducing a special LPT sequence (I. M. Sobol' and R. B. Statnikov, Nauka Press, Moscow, 1981) to maximize the information obtained from such calibration measurements. But their approach still requires the use of many radioactive source measurements, and is limited to only the front hemisphere of a detector and to source-to-detector distances of no more than 10 cm. A semi-computational model has also been used by Aaltonen and her co-workers (H. Aaltonen et. al., Nucl. Instr. Meth. A339 (1994) 87).

It has also been proposed that the calibration measurements be replaced with mathematical simulations such as using Monte Carlo techniques. Rogers (D. W. O. Rogers, Nucl. Instr. Meth. 199 (1982) 531) shows some success with Monte Carlo modeling, but has difficulty with the absolute efficiency calibration for Ge detectors. Debertin and Grosswendt (K. Debertin and B. Grosswendt, Nucl. Instr. Meth. 203 (1982) 343) also use Monte Carlo methods with some success, but rely on a known radioactive source for the primary calibration, and only use the mathematical computation for some correction factors. Nakamura and Suzuki (T. Nakamura and T. Suzuki, Nucl. Instr. Meth. 205 (1983) 211) obtained better results with primary Monte Carlo calculations, but this was only for simple high efficiency geometries. Good results for simple high efficiency geometries have also been obtained by Kamboj and Kahn (S. Kamboj and B. Kahn, Health Physics 70 (1996) 512). However, the computational requirements are very significant and make this approach impractical for a general purpose case. F. Bronson and L. Wang (F. Bronson and L. Wang, Proceedings of Waste Management 96, February 1996, Tucson Ariz.) document the satisfactory use of this Monte Carlo code as a primary calibration technique for a wide variety of simple and complex geometries. But, again, the modeling time and computation time are very extensive.

For certain types of samples, the various approaches described above have provided a solution. If the sample geometry does not change from sample to sample, if the detector physical parameters are well known, and if the source-detector geometry is such that the Monte Carlo computations can proceed quickly, then a one time investment in the calibration effort with Monte Carlo codes may well be worth it.

Accordingly, it is a principal object of the present invention to provide a method for the mathematical characterization of a detector without the use of any radioactive sources.

It is a further object of the invention to provide such a method that can compute specific sample efficiencies in from a few seconds to a few minutes.

It is an additional object of the invention to provide such a method that is applicable to a wide variety of sample shapes and sample-to-detector orientations.

Other objects of the present invention, as well as particular features, elements, and advantages thereof, will be elucidated in, or be apparent from, the following description.

DISCLOSURE OF INVENTION

A method of calibrating and using a radiation detector to measure radioactivity of a radioactive object, comprising: a) characterizing said detector by defining a plurality of efficiency calibration point locations in an environment around said detector; (b) providing a calibration source with at least one energy at each of said efficiency calibration point locations; (c) dividing said efficiency calibration point locations into at least one characterization region around said detector; (d) determining efficiency at each of said calibration point locations for each said at least one energy; (e) providing at least one detector characterization equation describing absolute efficiency as a function of energy, angle, and distance from said detector; (f) comparing shape of said radioactive object to a variety of models with standard sample shapes, selecting a model with shape similar to said shape of said radioactive object, and inputting to said model all necessary parameters to describe the composition and location of at least one radioactive source region within said model, inputting to said model location and composition of all attenuating materials, and inputting to said model detector location and its orientation with respect to said at least one radioactive source region; (g) dividing said at least one radioactive source region into a large number of voxels; (h) defining a location of a specific point within each of said large number of voxels; (I) determining efficiency at locations of specific points using said at least one detector characterization equation described in step (e); (j) repeating steps (h) through (I) for all said large number of voxels at a specific energy; (k) when said model comprises multiple radioactive source regions, repeating steps (g) through (j) and summing the data for each multiple radioactive source region in proportion to a specified relative concentration of radioactivity in each of said multiple radioactive source regions; (l) repeating steps (g) through (k) for all necessary energies to compute a final efficiency for each of said necessary energies; (m) using said computed final efficiencies to efficiency calibrate said detector; and (n) using said efficiency calibrated detector to measure radioactivity of said radioactive object.

BRIEF DESCRIPTION OF DRAWINGS

FIG. 3A illustrates the variable voxel size subdivision algorithm for a parallelopipedon shape.

FIG. 3B illustrates the variable voxel size subdivision algorithm for a cylindrical shape.

FIG. 3C illustrates the variable voxel size subdivision algorithm for a spherical shape.

BEST MODE FOR CARRYING OUT THE INVENTION

Figure 1:
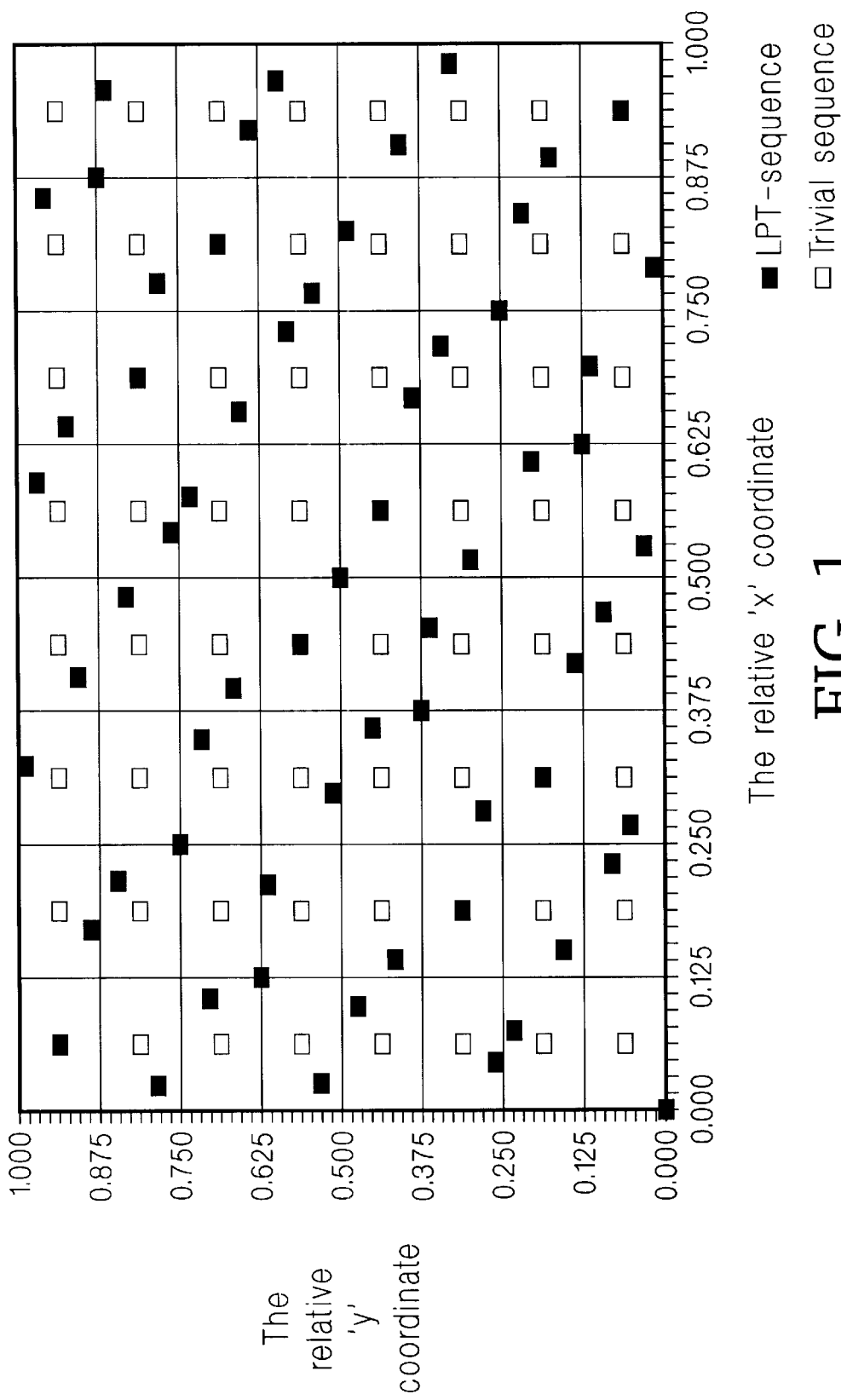
FIG. 1 is a graph showing the a comparison of the LPT sequence with the trivial uniform sequence.

The method of the present invention uses a novel combination of several new techniques, which are the subject of the present invention.

1. The initial detector characterization is performed by creating a large series of calibrated point locations in the environment surrounding the detector. Each point location must be calibrated for all energies that will be measured. And the calibrated environment around the detector must encompass all locations where the object to be measured will be.

The technique allows either radioactive standard point sources to be used or mathematical "point sources" such as by the Monte Carlo techniques proposed by Bronson and Wang (F. Bronson and L. Wang, Proceedings of Waste Management 96, February 1996, Tucson Ariz.). The Monte Carlo mathematical calculation techniques allow the extension of the calibrated region to a wide range of energies (e.g. 50–7000 keV) and distances (e.g. 0–50 m), and angles (e.g. all 4 pi steradians around the detector).

2. The placement of each of these points in the environment surrounding the detector can be accomplished in many methods. They could be evenly spaced, or randomly spaced. Those methods have been improved by the user of the LPt methodology, as originally suggested by Atrashkevich and Kolotov (V. V. Atrashkevich and V. P. Kolotov, J. Radioanal. Nucl. Chem. 169 (1993) 397). This allows a fewer number of points to be used, but still obtaining the same quality of information.

3. To convert these large number of calibrated point locations, each with a large number of energies into a suitable detector characterization for small to large samples, at zero to large sample-to-detector distances, and at low to high energies, we have extended and modified the method suggested by Atrashkevich and Kolotov (V. V. Atrashkevich and V. P. Kolotov, J. Radioanal. Nucl. Chem. 169 (1993) 397). The points are grouped into various characterization regions around the detector to better allow the wide dynamic range of the efficiency values to be handled. Each characterization region has its own source placement strategy, including the use of the LPt sequence and other placements, so as to provide continuity of the efficiency functions from one region to another. The end result is a series of mathematical equations describing the absolute efficiency as a function of energy, angle, and distance from the detector.

4. In addition, we have created a series of mathematical models to simulate a wide variety of common sample shapes [boxes, spheres, cylinders, hollow cylinders, closed-end hollow cylinders, stacked discs, stacked boxes, etc.]. These models allow easy input of all necessary parameters to fully describe to the method the appropriate parameters. This includes:

the dimensions and location of the radioactive parts [source regions] of the object;

when the object has multiple radioactive parts [multiple source regions] the relative concentration or radioactivity with each of those source regions;

the dimensions and location of non-radioactive parts of the object;

the dimensions and location of any additional non-radioactive absorbers between the object and the detector;

the dimensions, location, and composition of any collimators around the detector;

the composition and density of all radioactive and non-radioactive items;

the temperature and pressure and water content of the air surrounding the detector and object;

the location of the detector with respect to the object;

the angular orientation of the detector with respect to the object;

a series of energies of interest.

5. The method includes a technique to calculate the energy dependent mass attenuation coefficients for the matrices of the sources and the non-sources in the sample using an algorithm that evaluates chemical formulae and elemental combinations, as input by the user.

6. The method also includes a technique to compute the energy dependent mass attenuation coefficients for any air [corrected for temperature, barometric pressure, and relative humidity] between the sample and the detector.

7. We have further developed a mathematical algorithm to divide each source region of the model into a large number of voxels, (e.g. 1024). One implementation uses a technique where all the voxels are the same size. Another implementation uses a more advanced algorithm where the most important voxels are more numerous and smaller than the less important voxels. This is a more efficient technique requiring less computer time. The first source region is then divided into a large number of voxels.

8. A point location is defined within each voxel. The location of this point could be determined by always placing it in the center, but this would cause bias. Or, it could be randomly placed. Or, it can be placed using the LPt method, which is the preferred implementation as that gives the most information with the fewest number of points and does not have bias.

9. Using the equations and parameters for those equations developed in step 2, the efficiency for the first point location is computed.

10. Using the dimensions within the model, the distance and pathway between that point and the detector is computed. Using the information about the material composition within the model, the pathway lengths through each of these materials is computed.

11. Using the mass attenuation coefficients developed in steps 5 and 6, the efficiency is corrected for absorption, to derive the efficiency for that point of that voxel.

12. Since collimators [shields around the detector with holes that allow selective directional gamma penetration] are common in the application, the method includes a novel and flexible collimator attenuation correction technique. A series of rays are created between the voxel point and various portions of the detector. The path length through the collimator portion of each ray is computed, and then the efficiency for that voxel is further corrected for absorption using the mass attenuation coefficients developed in steps 5 and 6. An improved implementation creates these rays to intersect all projected surfaces of the detector as seen from that voxel point. A further improvement uses the LPt sequence to create the distribution of intersection points on the detector surface.

13. Steps 9–12 are repeated for all voxels. All of these point efficiencies are summed.

14. Then, the number of voxels is doubled as per step 7, and steps 8–13 are repeated. The 2 values are compared, and if the difference is too large, the number of voxels is doubled again, repeating steps 8–13 again, and this result compared to the previous one. This doubling and comparing process is completed until the change is small and negligible.

15. Then steps 7–14 are repeated for each source region. The output from step 14 is added in proportion to the relative concentration of each source region, as input into step 4.

16. Then, steps 7–15 are repeated each of the series of energies input by the user in step 4.

17. At this point, the computer program has a series of efficiencies at the energies as defined by the user. The standard Canberra Genie-PC or Genie-2000 or any other technique may then be used to create a mathematical equation that describes the efficiency vs. energy relationship for use in subsequent sample analyses.

Because of this new technique, the user can now compute accurate efficiency calibrations for a wide variety of samples [drums, boxes, pipes, Marinelli beakers, small sample containers, walls, floors, etc.] over a wide range of energies

[50–7000 keV], over a wide range of distances from the detector [from zero to 50 meters], at a wide range of angular positions of the sample [front to behind the detector], with or without collimators, and obtain the result in minutes, not months as before. The cost is now much lower than before, and no radioactive waste is generated.

A detailed description of the method of the present invention follows.

1. THE "VACUUM" DCG FUNCTIONS COMPUTATION

The MCNP method has been shown to be an excellent mathematical model to take into account all important interactions of the different gamma-energy photons with the materials of the detector, sample matrix, container, generic absorbers, collimator, and environment. Multiple testing of the MCNP demonstrates that this method of computation adequately reproduces the Detector Efficiency Response [DER] function. But because MCNP takes much time for the computations of very large sources, its "on line" application seems to be problematic even on high powered computers.

1.1 The VDEC Procedure for DCG—Versions 1.3 and Lower

To substantially reduce the computation time as compared to the full MCNP efficiency calibration process, and to simplify the mathematical model, we introduce the function called the Detector Calibration Generator [DCG] which approximates the DER [in vacuum] for any radioactive point source on the basis of the assumption that the real detector can be conceptually replaced by an effective point, called the Virtual Detector Effective Center [VDEC]. With the method, the VDEC is no longer required to be located at a constant place or somewhere inside the detector volume. It can be anywhere. Its location depends on both the radiation energy and coordinates [relative to detector] of the point source.

1.1.1 General Methodology

To determine the DCG function, either a radioactive source [old method] or MCNP [current method] is used to generate the efficiency for a series of energies at a series of point locations. These locations are determined by the LPt sequence method, and are uniformly, but not regularly distributed. The uniformly distributed point source set is used as the reference data. The same list of reference energies is used for each point of the set. Since the DER function is symmetrical relative to the detector axis, the DCG function need be determined only in a half-plane with H and R Cartesian coordinates, where H and R are coincided respectively with the detector axis and radius. Each MCNP efficiency value is treated as the following function value:

$$Ln(DER) = -[F1(E) + F2\{F3(H,E), F4(R,E)\}], \quad [1]$$

where E is the radiation energy, and the DER [in vacuum] is computed by MCNP for a point source with the H and R coordinates. The F1 and F2 terms are used to separate the source energy factor and the source-VDEC distance factor contributions into the DER value variation.

In other words, F1 is assumed to compensate the efficiency value differences depending on the radiation energy. The F1(E) values are calculated as the average Ln(DER) value of the reference points with the same energy. Then F1(E) is approximated as follows:

$$F1(E) = A0 + A1*Ln(E) + A2*\{Ln(E)\}^2 + \ldots + An*\{Ln(E)\}^n + B/E^k). \quad [2]$$

To find the A0 . . . An, and B coefficients of equation [2], the linear LSQ process is used at each new k value. The k value runs from the −3 to +3. The k value is assumed the best when the square error of the [2] approximation is minimal.

Then the F1 values are subtracted from the initial DER values to determine the F2 function. To find the F2 fitting function parameters, the following procedure is used.

The polynomial F2{F3(H,E),F4(R,E)} is of the following form:

$$F2 = C0 + C1*D + C2*D^2 + \ldots + Cn*D^n, \quad [3]$$

where the D value is the source-VDEC distance determined as the hypotenuse of the F3(H,E) and F4(R,E) function values. The F3(H,E) and F4(R,E) function values are respectively the source-VDEC distances along the H and R axis.

The F3(H,E) and F4(R,E) functions depend on E, H, and R as follows:

$$F3(H,E) = P0(E) + P1(E)*H + P2(E)*H^2 + \ldots + Pn(E)*H^n \quad [4]$$

and $$F4(R,E) = Q0(E) + Q1(E)*R + Q2(E)*R^2 + \ldots + Qn(E)*R^n. \quad [5].$$

Thus, if FF is the sum square error of the [3] approximation for the MCNP reference point efficiencies, the problem is to determine the |C|, |P(E)| and |Q(E)| vectors so that the FF is minimal.

To solve the problem, the random search and Newton's method combination is applied [see the algorithm description below].

The DER function value substantially varies depending on the point source location relative to detector. So, the front DER function differs from the side DER function due to the cylindrical shape of detector. Furthermore, as the source-VDEC distance decreases the DER function becomes more and more sophisticated. Therefore to attain satisfactory approximation of the real DER function, its domain of definition is divided into sub-ranges. First of all, the front hemisphere and side hemisphere DER sub-ranges are defined. Then each of them is divided into the 3 ranges [near to detector, middle, and far from detector]. Every range is limited by the length of the circle radius as follows:

1. near hemisphere range is from 0 to 0.175 m
2. middle hemisphere range is from 0.175 to 1.75 m
3. far hemisphere range is from 1.75 to 50 m.

In case of the front hemisphere range the origin is assumed to be at the detector end cap center. For the side hemisphere range the origin is assumed to be at the detector end cap corner. In other words, the horizontal shifting of the side origin relative to the front origin is equal to the end cap radius.

Thus the DCG consists of the six different polynomial functions, and each of them is intended to be used for the DER approximation in the limited part of the space around the detector.

The pseudo-random so-called LPt-sequence is used to determine the reference point coordinates relative to the detector. Using the special algorithm, this sequence can be computed for the n-dimension hypercube, where n can be arbitrary. The unique properties of this sequence are that regardless of the number of points generated, the points are not correlated, the points are uniformly distributed everywhere inside hypercube, and furthermore the projections of those points are uniformly distributed on each coordinate axis of the hypercube.

In our case only the 2-dimension LPt-sequence is needed. Where the radius length [r] and the angle [a] between the detector axis and the radius are selected as dimensions. The value of r is varied from zero to the maximum length allowed. The value of a is varied from 0 to 90 degrees. Each of the mentioned above six ranges contains 31 reference point locations. Thus 186 point source locations are generated using the LPt-sequence.

To assure that there are not significant discontinuities at the boundaries of the various DCG characterization regions, a series of sewing reference points are chosen. The reference points are selected so that they support parts of the overlapping regions. Namely, the 1st range limit radius is set to be 0.2 m, and the 2nd range limit radius is set to be 2 m. All points located in the [0, 0.2 m] radius interval are selected to fit the DCG function for the 1st range. Then all points located in the [0.15, 2 m] radius interval are selected to fit the DCG function for the 2nd range. Last, all points located in the [1.5, 50 m] radius interval are selected to fit the DCG function for the 3rd range. As the final result, the overlapping tails of the two adjoining DCG functions are thrown out so that the adjoining range boundaries are selected to be at the middle of the overlap region.

To provide the sewing of the front and side adjoining functions, an additional 22 reference points [11 front and 11 side points] are located along the direction coincided with the detector end cap radius. There are 4 points per range [in the case of the 1 st and 2nd ranges] and 3 points [in the case of 3rd range]. The paired points have the same r value and approximately the same a value [a~=+90° in the case of a front point and a~=−90° in the case of a side point]. In each range the additional points are distributed uniformly.

Thus, a total of 208 reference point locations are generated to fit the DCG function to approximate the real DER in the range limited by a sphere with a 50 meters radius. Then the MCNP method is used to generate the DER for each reference point source location at nominally 10 different energy values [50, 65, 80, 100, 120, 200, 500, 1000, 2500, and 7000 keV].

1.1.2 The DCG Parameters Determination [Description of Algorithm] Step 0.

Select the start FF value to be certainly greater than expected [for example 1.0e20].

Set the start values for the |P(E)| and |Q(E)| vectors as follows:

$$SP0(Ei) = SQ0(Ei) = 0 \quad I = 1, 2, \ldots m$$

$$SP1(Ei) = SQ1(Ei) = 1 \quad I = 1, 2, \ldots m$$

$$SPj(Ei) = SQj(Ei) = 10^{-(2*j)} \quad I = 1, 2, \ldots m; j = 2, 3, \ldots n$$

Set the variability ranges for the |P(E)| and |Q(E)| as follows:

$$DP0(Ei) = DQ0(Ei) = 100 \quad I = 1, 2, \ldots m$$

$$DP1(Ei) = DQ1(Ei) = 1 \quad I = 1, 2, \ldots m$$

$$DPj(Ei) = DQj(Ei) = 10^{-(2*j-1)} \quad I = 1, 2, \ldots m; j = 2, 3, \ldots n$$

m is the reference energies number and n is the polynomial power in both the [4] and [5] equation. n depends on the range [see the range notation above] where the DCG function fitting is intended to be done. n is equal to 3, 2, and 1 respectively for the 1st, 2nd, and 3rd range.

Set the RSflag=0 indicating that only the random search method was applied but Newton's method was not used yet. Set the K=0 [counter of the Step 1 iterations].

Step 1

Select the random values for the |P(E)| and |Q(E)| vectors as follows:

$$Pj(Ei) = SPj(Ei) + DPj(Ei) * x_j \quad I = 1, 2, \ldots m; j = 0, 1, \ldots n$$

$$Qj(Ei) = SQj(Ei) + DQj(Ei) * x_{n+j} \quad I = 1, 2, \ldots m; j = 0, 1, \ldots n$$

where the $|x|_K$ is the vector of the pseudo-random independent variables which are changing in the [−0.5,0.5] range. The $|x|_K$ vector is renewed at each Step 1.

Step 2

Using the linear LSQ procedure, calculate the |C| coefficients vector of equation [3] at the current |P(E)| and |Q(E)| vectors. Calculate the sum square error [FF] of equation [3] approximation using the full MCNP reference point set. If the current FF value has decreased compared to the previous value, then store the current FF value.

Step 3

Select first energy value (E) of the reference energies list [j=1].

Step 4

Let |x|=|P0(Ej),P1(Ej), . . . , Pn(Ej),Q0(Ej),Q1(Ej), . . . ,Qn(Ej)|. In other words, the vector |x| includes both equation [4] and [5] coefficients, which values [at current Ej] are subject to improvement. For this purpose the Newton's iteration scheme is used.

The next estimation of the parameters vector x[i+1] is evaluated from the previous estimation x[i] with the formula:

$$x[i+1]=x[i]+\text{delta}(x).$$

Where the delta(x) increment vector is found with solving the matrix equation:

$$ff'+ff''*\text{delta}(x)=0,$$

where the ff designates the sum square error of the approximation [3] for the MCNP reference point efficiencies at the current Ej value only. The ff' is the first partial derivatives vector of the ff calculated at the x[i] vector values. The ff'' is the square symmetrical matrix of the second partial derivatives of the ff [so-called Jacobean] calculated at the x[i] vector values.

Step 5

Store the improved |x| vector for the current Ej energy value. If the reference energies list is exhausted go to the Step 6, else select next value of the Ej [j=j+1] and go to Step 4.

Step 6

Using the linear LSQ procedure, recalculate the |C| coefficients vector of the [3] equation at the improved |P(E)| and |Q(E)| vectors. Calculate the sum square error [FF] of the equation [3] approximation using the full MCNP reference point set.

If the FF current value is decreased more than the 0.1% against previous value, then store the current FF value as well the |C|, |P(E)| and |Q(E)| vectors values, else go to Step 7.

If the RSflag=0 and the Step 3 was iterated two times in succession, then set the K=0 and the RSflag=1, reset both the start values and the variability ranges for the |P(E)| and |Q(E)| vectors as follows:

$$SPj(Ei)=DPj(Ei)=\text{current } Pj(Ei)$$

$$SQj(Ei)=DQj(Ei)=\text{current } Qj(Ei)$$

where I=1, 2, . . . m; j=0, 1, . . . n; and go to Step 1.

If Step 3 has been iterated less than 100 times, go to Step 3.

Step 7

If the Step 1 number of iterations [K] is less than 32, then set K=K+1 and go to Step 1, else go to Step 8.

Step 8

Approximate each Pj(E) and Qj(E) coefficient in the form of the following polynomial and store the all parameters of the DCG function in the ASCII file [see file format below]:

$$Pj[\text{or } Qj] = W0 + W1*Ln(E) + W2*\{Ln(E)\}^2 + \ldots + Wn*\{Ln(E)\}^n \quad [6].$$

The END of procedure.

1.2 Kriging Procedure For DCG Used in Version 2.0

To improve the correctness of the representation of the true DER function by the DCG process over the procedure used in section 1.1, we now represent the vacuum DER function as the grid based on Kriging interpolation between the reference data points. The reference data points are obtained with the MCNP calculation method.

1.2.1 General Kriging Methodology

Kriging is a well-known geostatistical method that is used in many scientific application to produce a grid for the irregular z=f(x,y) data set. In the current application of the method, we use Surfer, a commercially available computer program to do the Kriging process. Other kriging methods may also be used. If we assume the discrete domain of the DER function is defined by a three-dimension [x,y,z] dataset, where x and y are at regular intervals and each x/y intersection [node] has a z value, then "irregular" means that the initial data set has many "holes" where data [x,y,z] are missing [or not presented]. So, the gridding goal is to fully fill this dataset. To supplement the initial dataset with new data, Kriging is used for interpolation between the initial points in the dataset taking into account the trend and variability of the primary points of the dataset. When the grid is fully defined, it can be used to generate new data anywhere inside the domain of the grid definition using any kind [linear or parabolic] of interpolation between nodes.

It is clear, that the grid interpolation quality will depend on the selection of the reference datapoint X-Y coordinates. To generate the datapoint X-Y coordinates, the so-called LPt-sequence is used. This sequence has three unique properties important for gridding. Its points are not correlated (1). The points are uniformly distributed on the X-Y plane (2). The projections of those points are uniformly distributed on both the X and Y coordinate axis (3). If for example 64 LPt-points are selected on the unit square, then each point is located in a unique little square with exactly ¹⁄₆₄ of the unit square area. And each point is represented by both unique X and Y coordinates. So, there are 64 different X and the 64 different Y coordinates. And the distance between the adjacent X [as well as Y] coordinates is exactly ¹⁄₆₄ of the unit square side.

As it can be easily seen, the trivial (regular) grid distribution with the same number of points doesn't have the property (1) and is represented by only 8 different X and Y coordinates (see FIG. 1). Thus, it means that the LPt-sequence is a factor of 8 more informative than the trivial grid distribution although the number of datapoints is the same for both cases.

Furthermore the LPt-sequence has one more very useful property. Namely, if in the previous example the LPt-sequence is continued on for another 64 points, then the second set of points appear exactly between the first set points. In other words, the second set of points are embedded in the first set points. And none of the second set of points coincides with any point of the first set. The last property is used while the checking of the statistical robustness of the computed DER function grid [see later statistical test description].

Since the DER function is symmetrical relative to the detector axis, the DCG may be determined only on a half-plane with the H and R Cartesian coordinates, where the H and R axes are coincided respectively with the detector axis and radius and both start at the origin that is located in the endcap center. So, any point located behind the endcap front has a negative value of the H coordinate.

The DER function value varies substantially [7–10 orders of magnitude] depending on the point source location relative to detector [0–50 m distance]. As the source-endcap distance decreases the DER function becomes more and more sophisticated. Therefore to attain the satisfactory grid representation of the real DER function, 3 different subranges in the domain of the DER function definition are defined [near to endcap, middle, and far from endcap]. Every range is limited by the rectangle as follows:

Range 1 the inside contour is limited by the endcap dimensions the outside contour is limited by R=0.2 m; |H|=0.2 m Range 2 the inside contour is limited by the outside contour of the range 1 the outside contour is limited by R=2 m; |H|=2 m

Range 3 the inside contour is limited by the outside contour of the range 2 the outside contour is limited by R=50 m; |H|=50 m.

Thus three separate grids are used to cover the all the domain of the DER function definition at a single energy. The reference datapoints of each region are used together to manufacture a grid [see below the selection of the reference datapoints coordinates]. Each region's dataset has 10 efficiency values corresponding to the 10 energies list [50, 65, 80, 100, 120, 200, 500, 1000, 2500, and 7000 kev]. Thus the complete DCG contains 30 different grids.

2 Selecting the MCNP Datapoint Coordinates for Gridding [Primary Set]

Each region contains 62 LPt-points. Here the "+" and "−" are used to refer to the datapoints located above [H>0, R>=0] and below [H<0, R>=0] the endcap respectively. Since the (+)datapoints are used to be symmetrical to the (−) datapoints, the following 31 LPt-points are selected in the unit square:

| # | X1i | X2i |
|---|---|---|
| 1 | 0.50000 | 0.50000 |
| 2 | 0.25000 | 0.75000 |
| 3 | 0.75000 | 0.25000 |
| 4 | 0.12500 | 0.62500 |
| 5 | 0.62500 | 0.12500 |
| 6 | 0.37500 | 0.37500 |
| 7 | 0.87500 | 0.87500 |
| 8 | 0.06250 | 0.93750 |
| 9 | 0.56250 | 0.43750 |
| 10 | 0.31250 | 0.18750 |
| 11 | 0.81250 | 0.68750 |
| 12 | 0.18750 | 0.31250 |
| 13 | 0.68750 | 0.81250 |
| 14 | 0.43750 | 0.56250 |
| 15 | 0.93750 | 0.06250 |
| 16 | 0.03125 | 0.53125 |
| 17 | 0.53125 | 0.03125 |
| 18 | 0.28125 | 0.28125 |
| 19 | 0.78125 | 0.78125 |
| 20 | 0.15625 | 0.15625 |
| 21 | 0.65625 | 0.65625 |

-continued

| # | X1i | X2i |
|---|---|---|
| 22 | 0.40625 | 0.90625 |
| 23 | 0.90625 | 0.40625 |
| 24 | 0.09375 | 0.46875 |
| 25 | 0.59375 | 0.96875 |
| 26 | 0.34375 | 0.71875 |
| 27 | 0.84375 | 0.21875 |
| 28 | 0.21875 | 0.84375 |
| 29 | 0.71875 | 0.34375 |
| 30 | 0.46875 | 0.09375 |
| 31 | 0.96875 | 0.59375 |

As long as the LPt-coordinates are relative, the same X1i,X2i pairs are used to determine the R and H coordinates for each region following the formulas:

$$Ri = Lj * X1i \quad [j=1,2,3]$$

$$Hi = Lj * X2i$$

where a Lj is the square side dimension for the 1+,2+, and 3+ sub-region [0.2, 2.0 and 50.0 meter respectively].

The symmetrical points [Ri and −Hi] are used for the 1−, 2− and 3− sub-regions. Thus the total number of the LPt points is equal to 186 [31*2*3].

"sew" the 1,2 and 2,3 region grids, several additional points located just at the region boundaries are added using equal steps along the boundary. It is recommended to select the "sewing" points so that a step is divisible by 8 micro-steps of the left region. So, if the 1st region contains the 31 LPt points, a step along the 1,2 region boundary is equal to 8*L1/32 [0.05 m]. The "sewing" point steps along the 2,3 region boundary are calculated in just the same way as 8*L2/32 [0.5 m]. Thus the "sewing" points have the following coordinates ["rDC" means below the RDC radius]:

| # | R12 | H12 |
|---|---|---|
| 187 | 0 | L1 |
| 188 | 0.25*L1 | L1 |
| 189 | 0.50*L1 | L1 |
| 190 | 0.75*L1 | L1 |
| 191 | L1 | L1 |
| 192 | L1 | 0.75*L1 |
| 193 | L1 | 0.50*L1 |
| 194 | L1 | 0.25*L1 |
| 195 | L1 | 0 |
| 196 | L1 | −0.25*L1 |
| 197 | L1 | −0.50*L1 |
| 198 | L1 | −0.75*L1 |
| 199 | L1 | −L1 |
| 200 | 0.75*L1 | −L1 |
| 201 | 0.50*L1 | −L1 |
| 202 | 0.25*L1 | −L1 |
| 203 | rRDC | −L1 |
| 204 | 0 | L2 |
| 205 | 0.25*L2 | L2 |
| 206 | 0.50*L2 | L2 |
| 207 | 0.75*L2 | L2 |
| 208 | L2 | L2 |
| 209 | L2 | 0.75*L2 |
| 210 | L2 | 0.50*L2 |
| 211 | L2 | 0.25*L2 |
| 212 | L2 | 0 |
| 213 | L2 | −0.25*L2 |
| 214 | L2 | −0.50*L2 |
| 215 | L2 | −0.75*L2 |
| 216 | L2 | −L2 |
| 217 | 0.75*L2 | −L2 |

-continued

| # | R12 | H12 |
|---|---|---|
| 218 | 0.50*L2 | −L2 |
| 219 | 0.25*L2 | −L2 |
| 220 | rRDC | −L2 |

Furthermore it is necessary to support the grids along the outer contours of the region. It is recommended to select the same step value as for the sewing points [8 micro-steps of the region]. Thus the points located on the outer contour of regions have the following coordinates:

| # | R | H |
|---|---|---|
| 221 | 0 | 0 |
| 222 | 0 | 0.25*L1 |
| 223 | 0 | 0.50*L1 |
| 224 | 0 | 0.75*L1 |
| 225 | 0 | 0.25*L2 |
| 226 | 0 | 0.50*L2 |
| 227 | 0 | 0.75*L2 |
| 228 | rRDC | −0.25*L2 |
| 229 | rRDC | −0.50*L2 |
| 230 | rRDC | −0.75*L2 |
| 231 | 0 | 0.25*L3 |
| 232 | 0 | 0.50*L3 |
| 233 | 0 | 0.75*L3 |
| 234 | 0 | L3 |
| 235 | 0.25*L3 | L3 |
| 236 | 0.50*L3 | L3 |
| 237 | 0.75*L3 | L3 |
| 238 | L3 | L3 |
| 239 | L3 | 0.75*L3 |
| 240 | L3 | 0.50*L3 |
| 241 | L3 | 0.25*L3 |
| 242 | L3 | 0 |
| 243 | L3 | −0.25*L3 |
| 244 | L3 | −0.50*L3 |
| 245 | L3 | −0.75*L3 |
| 246 | L3 | −L3 |
| 247 | 0.75*L3 | −L3 |
| 248 | 0.50*L3 | −L3 |
| 249 | 0.25*L3 | −L3 |
| 250 | rRDC | −L3 |
| 251 | rRDC | −0.75*L3 |
| 252 | rRDC | −0.50*L3 |
| 253 | rRDC | −0.25*L3 |

The 8 following datapoints are intended for the grids supporting the endcap surface [where Rec and Lec are the radius and length of endcap respectively]:

| # | | |
|---|---|---|
| 254 | 0.25*Rec | 0 |
| 255 | 0.50*Rec | 0 |
| 256 | 0.75*Rec | 0 |
| 257 | Rec | 0 |
| 258 | Rec | −0.25*Lec |
| 259 | Rec | −0.50*Lec |
| 260 | Rec | −0.75*Lec |
| 261 | Rec | −Lec |

So the total number of required MCNP reference datapoints is equal to 261 [186 LPt points plus 34 "sewing" points plus 41 points on the region contours].

Figure 2A:
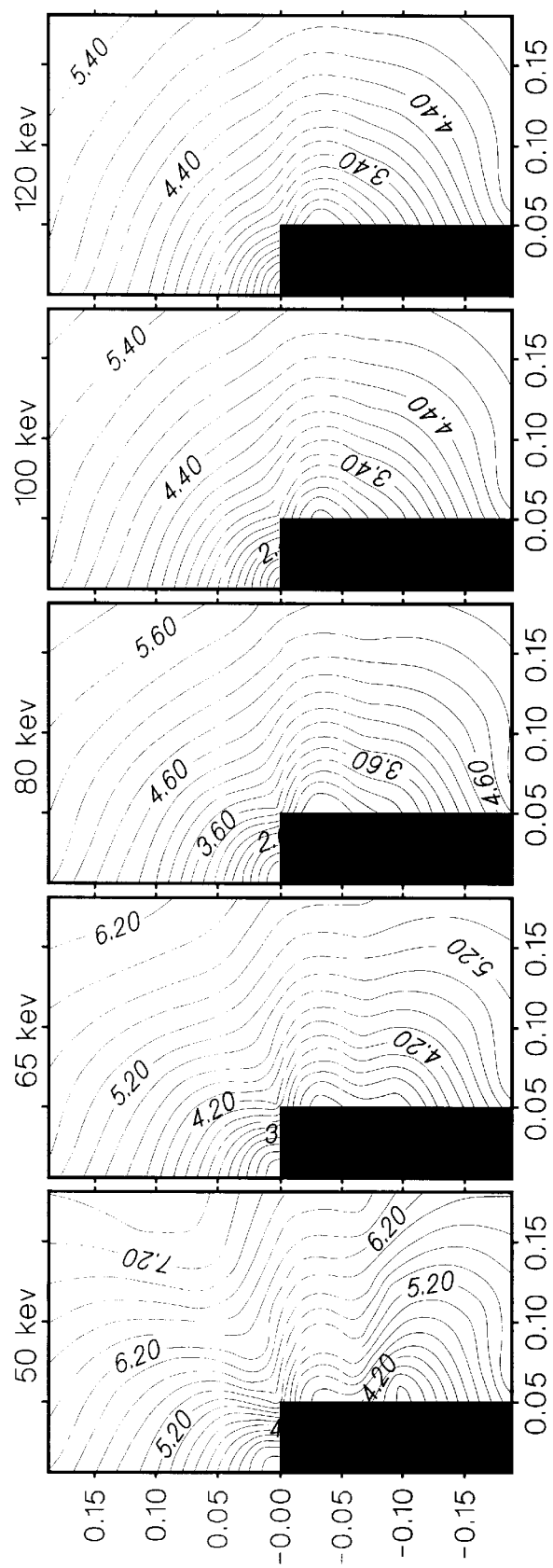
FIGS. 2A and 2B show typical detector efficiency responses for various energies.
Figure 2B:
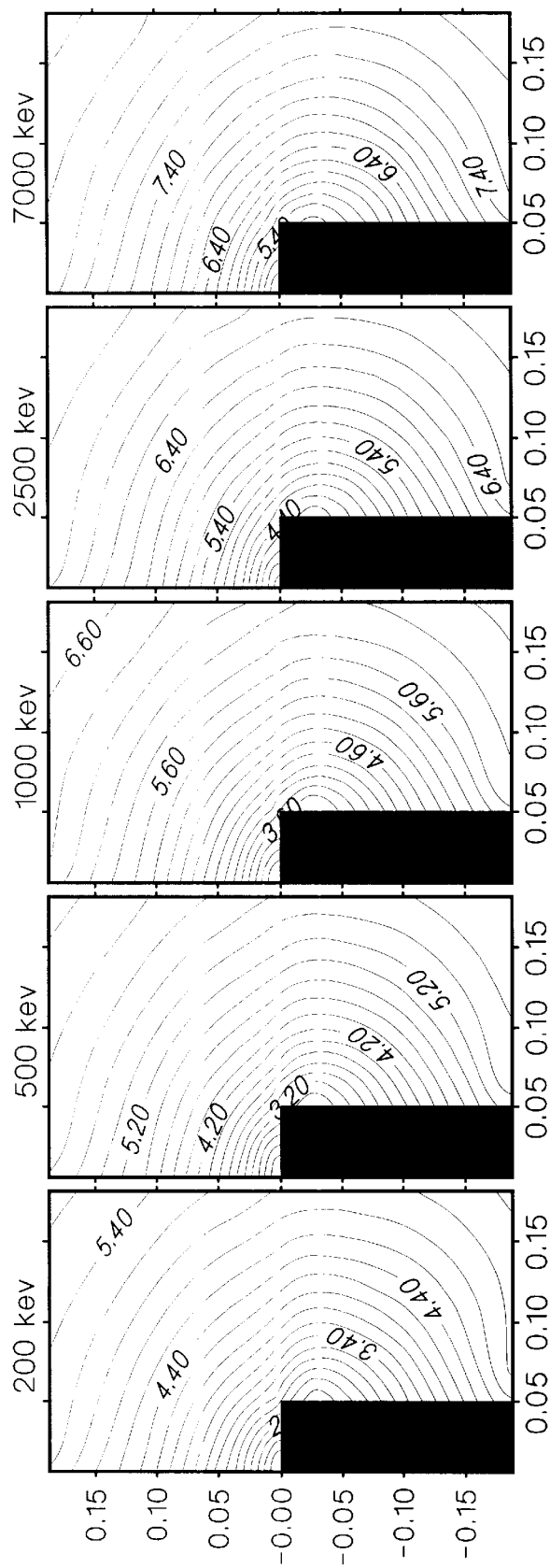

1.2.3 Procedure to Produce the DCG and to Generate the Comparison Between the DCG and the MCNP Efficiency To produce the DCG for any detector, each of the 30 sets is processed by Surfer to manufacture the grids. Then the separate grids are compiled into the generic DCG file to be used in future applications of the method. FIG. 2 shows a typical output using this process. This shows the efficiency of a typical detector in the spatial region of a 20 cm diameter×20 cm tall cylinder, with the detector in the center of the region, e.g. a typical laboratory detector and space within the counting shield.

Step 1

Generate the primary set of the MCNP datapoints using the coordinates presented in the 1.1 section. Invoke the Kriging process with the Surfer program.

Step 2

Do the DCG for the primary set based on the grids done by Kriging.

Step 3

Upgrade the primary datapoints set with new LPt-datapoints so that the total datapoints number is 8 times as much. In other words, create the secondary datapoint set continuing the LPt-sequence from point #32 up to point #255 generating each datapoint efficiency using the DCG of step 2. None of the added datapoints coincides with any of the primary datapoints. Thus the "predictability" of the primary datapoints set will be extended into the "holes" of the domain of the DER function. And due to the large number of added datapoints, the secondary set may be used as a test to estimate the statistical robustness of the primary set. Invoke the Kriging process with Surfer.

Step 4

Do the DCG for the secondary set based on the grids done by Kriging.

Step 5

Recalculate the primary set efficiencies using the DCG of the step 4. Do statistical comparison between the DCG produced with the secondary set and MCNP efficiency [the primary set].

1.2.4 The DCG/MCNP Statistical Comparison Report

The report is automatically stored into the file with the extension *.STA when procedure 1.2 of the comparison between the DCG and MCNP efficiency is completed.

The report contains the following items:

calibrated detector name and date of calibration;

calibrated region definition;

notation and formulas used to compute the statistics estimates;

average relative deviation listing for the MCNP reference datapoint locations;

standard deviation table for the various regions;

number of points within the 68%, 95%, 99%, and greater than 99% [anomalous] CL intervals;

list of the datapoints with the anomalous relative deviation;

statistical bias table [comparing the region DCG absolute average bias to the standard deviation];

target absolute bias table [comparing the region DCG absolute bias to the target bias value];

target standard deviation table [comparing the region DCG standard deviation to the target value].

2. THE VOLUME EFFICIENCY INTEGRATION

Any model of the method is assumed to be a set of the following objects:

source container [optional]

one or more source volumes [at least one of them is radioactive]

collimator [optional]

detector housing [optional]

environment inside detector housing [if housing is present]

environment surrounding container and filling any undefined space generic absorbers [optional]

Each radioactive source volume efficiency is determined separately. They are then summed to generate the total efficiency of the sample. The summing process uses the input relative radioactive concentration for each radioactive source layer as the weighting factors.

2.1. Description of the Uniform Voxel Size Integration Algorithm Being Used at Present The DER function for a specified point source can be presented in the general case as the superposition of the following function:

$$F(X1,X2,X3)=DCG(X1,X2,X3)*f_{att}(X1,X2,X3)*f_{col}(X1,X2,X3), \quad [2.1]$$

where X1, X2, and X3 are the point source coordinates along the x1, x2, and x3 axes respectively [it doesn't matter if Cartesian, cylindrical or spherical coordinates are used]. The DCG is the DER in vacuum by either method [see above the DCG function computation descriptions]. The $f_{att}$ is the function accounting for all types of attenuation except the collimator attenuation [sample matrix, container, detector housing, generic absorbers, and environment]. And $f_{col}$ is the collimator attenuation factor. Thus to compute a volume efficiency it is necessary to integrate the F(X1,X2,X3) integrand over the sample volume as follows:

$$\text{Volume efficiency} = \Sigma_{X1}\Sigma_{X2}\Sigma_{X3}F(X1,X2,X3)dX1*dX2*dX3 \quad [2.2]$$

As it can be seen from the [2.1] equation, the integrand can not be represented analytically and could be integrated only numerically.

There are two possibilities for numerical integration, namely, to use either quadrature formulas or a Monte Carlo method. The equations of both methods are given below.

The 'm' points quadrature method formula:

$$I = \sum_{i=0}^{m}\sum_{j=0}^{m}\sum_{k=0}^{m} Ai*Aj*Ak*F(i*dX1, j*dX2, k*dX3)*dV, \quad [2.3]$$

where I is the numerical integral value; m is specified points number [on each axis] to fit the integrand inside the volume [ΔV] to be integrated; dV=ΔV/m³; Ai, Aj, and Ak are the quadrature coefficients which satisfy the condition: ΣA=1.

The Monte-Carlo method formula:

$$I = \sum_{i=1}^{N} F\{\xi i(X1, X2, X3)\}*dV, \quad [2.4]$$

where ξi(X1,X2,X3) is the random point inside the volume [ΔV] to be integrated; N is the number of points selected for integration; dv=ΔV/N.

The rough estimation of the degree of convergence for methods [2.3] and [2.4] can be determined as follows:

The degree of convergence for the 'm' points quadrature method:

$$I-Ir \sim \Delta V^{m+1}*F^{(m)}/2^{m+1} \quad [2.5]$$

The degree of convergence for the ordinary Monte-Carlo method:

$$I-Ir \sim \Delta V^{2}*F'/N^{1/2} \quad [2.6]$$

The degree of convergence for the Monte-Carlo method with the LPt-sequence:

$$I - Ir \sim \Delta V^{2^*} F'/N, \quad [2.7]$$

where the Ir is the exact value of integral; the F' and F$^{(m)}$ are the first and the m-th derivative of integrand respectively.

The integration method being used at present is the Monte-Carlo method with the Lpt-sequence, where $\Delta V$ is any radioactive layer [sub-sample]. This algorithm includes the sequential doubling of the number of LPt-points [N] in the layer's volume to be integrated until the required integration convergence is reached.

Due to the LPt-sequence properties [see above], each point represents the same volume, is unique, and is a uniformly distributed dV-volume of the total volume of the layer to be integrated. So, the dV-value appearing in equation [2.4] is constant and can be defined as follows:

$$dV = (\Delta X1 * \Delta X2 * \Delta X3)/N = \Delta V/N,$$

where $\Delta X1$, $\Delta X2$, and $\Delta X3$ are the dimensions of layer along the coordinate axes. In case of the Cartesian coordinates they are respectively the x,y,z dimensions of the rectangular parallelepiped. In case of cylindrical coordinates they are respectively the radius R, angle w and height H dimensions of the cylinder. And in case of spherical coordinates they are respectively the radius R, angles w and h dimensions of the sphere. If integration is carried out in the cylindrical or spherical coordinates, the dV value should be multiplied respectively by the r or r2cos(h) weight. Equation [2.4] can be rewritten for the Cartesian, cylindrical, and spherical coordinates as follows:

for Cartesian coordinates $$I_p = \left[ \sum_{i=1}^{N} F\{\xi i(x, y, z)\} \right] * \Delta X * \Delta Y * \Delta Z / N \quad [2.8]$$

where x, y, and z are changed in the $[0,\Delta X]$, $[0,\Delta Y]$, and $[0,\Delta Z]$ intervals respectively;

for cylindrical coordinates $$I_c = \left[ \sum_{i=1}^{N} r * F\{\xi i(r, w, h)\} \right] * \Delta R * 2 * o * \Delta H / N \quad [2.9]$$

where the r, w, and h are changed in the $[0,\Delta R]$, $[0,2*o]$, and $[0,\Delta H]$ intervals respectively;

for spherical coordinates $$I_s = \left[ \sum_{i=1}^{N} r^2 * \sin(h) * F\{\xi i(r, w, h)\} \right] * \Delta R * 2 * o^2 / N \quad [2.10]$$

where the r, w, and h are changed in the $[0,\Delta R]$, $[0,2*o]$, and $[0,o]$ intervals respectively;

To simulate any $\xi i(X1, X2, X3)$ random point coordinates, the 3-dimension LPt-sequence is used which delivers the random coordinates g1, g2, and g3 uniformly distributed in the unit cube. In other words, all coordinates g1, g2, and g3 are varied in the interval [0,1]. In case of Cartesian coordinates the g1, g2, and g3 are ready to be used as $x1=g1*\Delta X$, $X2=g2*\Delta Y$, and $X3=g3*\Delta Z$. But in case of cylindrical or spherical coordinates the following transformations are needed to do the uniformly distributed X1, X2, and X3 in the cylinder or sphere volume:

for cylinder $\quad X1 = R * g1^{1/2}, X2 = 2*o*g2,$ and $X3 = g3*\Delta H$ for sphere $\quad X1 = R * g1^{1/2}, X2 = 2*o*g2,$ and $X3 = \arccos(2*g3 - 1)$ As long as the DCG delivering the vacuum DER value is done in the Cartesian coordinates, the following relationships are used for the cylindrical and spherical coordinates transformation into Cartesian coordinates:

for cylinder
$X1_{car} = X1_{cyl} * \cos(X2_{cyl})$
$X2_{car} = X1_{cyl} * \sin(X2_{cyl})$
$X3_{car} = X3_{cyl}$ for sphere
$X1_{car} = X1_{sph} * \sin(X3_{sph}) * \cos(X2_{sph})$
$X2_{car} = X1_{sph} * \sin(X3_{sph}) * \sin(X2_{sph})$
$X3_{car} = X1_{sph} * \cos(X3_{sph})$ The number of LPt-points [N1] is always equal to 1023 to start the integration process for any layer. And the I1 integral value is computed using the corresponding equation of [2.8], [2.9], or [2.10]. Then the number of LPt-points is doubled [N2=2047] and the I2 integral value is computed. If the abs(I2–I1)/I2 value is less than the required convergence, the integration process is stopped. Else the I1=I2, N2=4095, the new I2 value is computed and the convergence test is applied again. The iterations are repeated until the required integration convergence is reached.

The maximum number of LPt-points that can be generated by the method is the $2^{20}-1$. So, the integration process will be also stopped if the LPt-points number is exhausted before the required integration convergence is reached. To avoid the situation like this, the "sub-dividing" algorithm as presented in section 2.2 will be used.

To compute the $f_{att}(X1,X2,X3)$ function of equation [2.1], the detector reference point is used to determine the pathway direction from the source specified point to detector. In case of points with positive height relative to the endcap front, the detector reference point is assumed to be located at the endcap center. In case of the points with negative height relative to the endcap surface, the detector reference point is assumed both to be located on the endcap side and nearest to the specified source point. Please see below in sections 2 and 3 the description of the $f_{att}$ and $f_{col}$ function computations.

2.2. Variable Voxel Size "Sub-dividing" Algorithm Description

Refer to FIG. 3 for graphical description of the items discussed in this section.

In case of a very extended sample [several meters], or the case where a sample very thick, or the case where the sample is partially collimated, the F function value will have a very wide range [from ~0.1 to ~1.0e-20 or less]. To provide the quick and guaranteed convergence of the integral of the F function, the following algorithm was developed.

The computation of the volume integral is done part by part starting from the maximum value of integrand. This point can be easily found by searching the sample surface using the detector reference point projection to the closest sample surface [if the collimator is absent], or the closest uncollimatoed sample surface [if the collimator is present]. This point is moved along the X1, X2, and X3 directions, depending on increase of decrease of the integral. The smaller the integral increase the greater the step value. Moving is done separately along each of three coordinates. Then a defined sub-volume is integrated. In just the same way the next step is done and so one until the whole of sample volume is exhausted.

Here is the step by step algorithm description.

Step 1

Find the maximum [Fmax] value of integrand in the sample volume and the corresponding X1max, X2max, and X3max coordinates:

Fmax=F(X1max,X2max,X3max).

Indicate the initial threshold [Td<1] of the integrand decreasing.

Indicate the required threshold [Tc=dI/I] of integral convergence.

Total integral value S=0;

The initial thresholds of the integrand decreasing along each coordinate axis TdX1=TdX2=TdX3=Td.

The SX1, SX2, and SX3 below are the partial integral values at moving along the X1, X2, and X3 axis respectively.

Step 2

(repeat to move back and forth away maximum along the X1 axis)

FX1max=Fmax; SX1=0; X11=X1max;

Step 3

Find the X12 coordinate value corresponding to the integrand decrease up to TdX1*FX1max moving only along the X1 axis. If the X1 dimension of sample is exhausted go to END.

Step 4

(repeat to move back and forth away maximum along the X2 axis)

FX2max=FX1max; SX2=0; X21=X2max;

Step 5

Find the X22 coordinate value corresponding to the integrand decrease up to TdX2*FX2max moving only along the X2 axis. If the X2 dimension of sample is exhausted then:

FX1max=TdX1*FX1max

SX1=SX1+SX2;

X11=X12;

TdX1 is equal Td in power (SX1/SX2);

go to Step 3.

Step 6

(repeat to move back and forth away maximum along the X3 axis)

FX3max=FX2max; SX3=0; X31=X3max;

Step 7

Find the X32coordinate value corresponding to the integrand decrease up to TdX3*FX3max moving only along the X3 axis. If the X3 dimension of sample is exhausted then:

FX2max=TdX2*FX2max;

SX2=SX2+SX3;

X21=X22;

TdX2 is equal Td in power the (SX2/SX3);

go to Step 5.

Step 8

Indicate the initial N points number for integral computation.

Compute the I0 integral value inside the volume limited by the following coordinate values:

from X11 to X12 from X21 to X22 from X31 to X32

Step 9

Double the points number [N=2*N] for integral computation.

Compute the I1 integral value inside the same volume.

Step 10

Check the dI=I0-I1 difference. If the dI/I1>Tc then I0=I1 and go to Step 9.

Step 11.

dS=dX1*dX2*dX3*(I0+I1)/2 where the dX1*dX2*dX3 is a volume element.

S=S+dS;

SX3=SX3+dS;

FX3max=TdX3*FX3max;

X31=X32;

TdX3 is equal Td in power the (SX3/dS);

go to Step 7.

END

The computed total integral value S at the required threshold [Tc] of integral convergence.

Some comparative characteristics of both the quadrature and Monte Carlo methods are presented in Table 1.

As we could see above, the integrand is a very sophisticated function. And it is impossible to predict its behavior in advance. That is why, to assure an adequate approximation of integrand in any region of integration, it is necessary to use at least the seven point formula in case of the quadrature method. Weddell's formula was applied in the following test computations. Of course, it is not the only formula which can be used for integration. But it has almost unique estimation for the degree of convergence.

An advantage of the seven point quadrature formula is, that it exactly reproduces the integrand, if it is a polynomial with power '6' or less in a region of integration. So, in this case the computed integral value is exact. It is possible because the estimation of the degree of convergence contains the integrand derivative of the 6-th degree as it is seen from the eq. [2.5]. However, we should test the convergence at each step of integration to be sure of the correctness of the computed integral value. Usually, to check convergence, the initial points number is doubled, and the integral value is recomputed. Then two integral values are checked for the required convergence. Here we can state a disadvantage of the quadrature formula. First, we need to spend about 90% of the total computation time for these calculations, and most of this time is not necessary for most of the cases. Secondly, we need to use almost three thousand points.

In this respect, the Monte Carlo method seems to be more flexible as it is seen from the comparative characteristics of both methods, as presented in Table 1. And it is proved by the computation results represented in Table 2.

TABLE 1

Comparative characteristics of Quadrature [QM] and Monte Carlo [MCM] methods

| Characteristics | Quadrature method | Monte Carlo method |
| --- | --- | --- |
| Points number | 343 for Weddell's formula | 63 for the LPt sequence |
| Doubling number of points | 2744 | 127 |
| Integrand type | Smooth, as polynomial with power '6' or less | Doesn't matter |
| Convergence checking | 89% of computation time | 67% of computation time |
| Threshold value [Td] | Depends on the F variability | Independ the F variability |

Table 2 has the results of integration of the trivariate normal distribution functions with varying width. The maximum value of the function is at the center of the sample volume. The computations are made by both methods for the rectangle, cylindrical and spherical samples. It should be noted, that the quadrature method was used here without convergence checking. But Monte Carlo method is doing the checking of convergence. In spite of that, the computation time in all cases is approximately equal for both methods.

It is interest to note that the computation time doesn't depend on the sample dimensions and depends only on the degree of the decrease of the integrand. It could seem to be strange that computations for rectangular samples take more time than for both the cylindrical and spherical samples. But it is due to the fact that rectangular computations are made in Cartesian coordinates. So, in this case it is necessary during integration to move in two directions along main coordinate [X1] and away of the sample center.

It is also of interest to note, that the Monte Carlo method gives more precise convergence then the required 1%. It is because the sub-volumes are successfully outlined. And if the required precision of convergence is set as the 5 or even 10%, the final results will be the same as at the 1% precision. But to reach the 0.5 or 0.1% precise of convergence it is necessary to spend much more computation time, as it is seen from the last six rows of the Table 2.

coefficient at energy E, and D is the material density. The $M_E$ values at the different E values for the simple materials [consisting of same atoms] are the physical constants and available in the handbook as the table data $[M_E, E]$. For convenience these discrete data are fitted with the logarithmic polynomials as follows:

$$Ln(M_E) = A0 + A1*Ln(E) + \ldots + A9*\{Ln(E)\}^9 \quad [3.1.2]$$

The polynomial coefficients A0, A1 . . . A9 for the chemical elements [from H to Pu] are stored in the $M_E$ initial library. This unchangeable part of the library is used later on to compute the $M_E$ for any composite material.

It is well known that the mass attenuation coefficients have an additivity property. Therefore the mass attenuation coefficient of any composite material can be represented as follows:

$$Ms = Sum(Vi*Mi), i=1,2, \ldots, n \quad [3.1.3]$$

where Ms is the mass attenuation coefficient for a composite material consisting of 'n' components; Mi and Vi are the

TABLE 2

Comparative computation results of Quadrature [QM] and Monte Carlo [MCM] methods

| sx = sy = sz (geometry) | D1 | D2 | D3 | Integral value QM | Integral value MC | t, s (25 MHz CPU) QM | t, s (25 MHz CPU) MC | Td | T % |
|---|---|---|---|---|---|---|---|---|---|
| 0.01 (R) | 60 | 60 | 60 | 1.0023 | 0.9972 | 18.5 | 18.7 | 0.1 | |
| 0.1 (R) | 60 | 60 | 60 | 1.0023 | 0.9972 | 18.4 | 18.7 | 0.1 | |
| 1 (R) | 60 | 60 | 60 | 1.0023 | 0.9972 | 18.4 | 18.7 | 0.1 | |
| 10 (R) | 60 | 60 | 60 | 0.9946 | 0.9919 | 2.4 | 3.0 | 0.1 | |
| 30 (R) | 60 | 60 | 60 | 0.3182 | 0.3188 | 2.4 | 2.3 | 0.1 | |
| 0.01 (C) | R = 30 | H = 60 | | 1.0019 | 1.0023 | 7.5 | 6.6 | 0.1 | |
| 0.1 (C) | R = 30 | H = 60 | | 1.0019 | 1.0023 | 7.5 | 6.6 | 0.1 | |
| 1 (C) | R = 30 | H = 60 | | 1.0019 | 1.0023 | 7.6 | 6.7 | 0.1 | |
| 10 (C) | R = 30 | R = 60 | | 0.9889 | 0.9917 | 3.0 | 2.8 | 0.1 | |
| 30 (C) | R = 30 | H = 60 | | 0.2686 | 0.2694 | 3.0 | 2.5 | 0.1 | |
| 0.01 (S) | R = 30 | | | 0.9999 | 1.0047 | 9.8 | 7.7 | 0.1 | |
| 0.1 (S) | R = 30 | | | 0.9999 | 1.0047 | 9.8 | 7.8 | 0.1 | |
| 1 (S) | R = 30 | | | 0.9999 | 1.0047 | 9.7 | 7.7 | 0.1 | |
| 10 (S) | R = 30 | | | 0.9707 | 0.9748 | 4.1 | 3.3 | 0.1 | |
| 30 (S) | R = 30 | | | 0.1987 | 0.1974 | 4.1 | 2.9 | 0.1 | |
| 1 (R) | 60 | 60 | 60 | | 0.9994 | | 19.8 | 0.1 | 0. |
| 1 (R) | 60 | 60 | 60 | | 1 | | 32.5 | 0.1 | 0. |
| 1 (C) | R = 30 | H = 60 | | | 1 | | 8.1 | 0.1 | 0. |
| 1 (C) | R = 30 | H = 60 | | | 0.9991 | | 16.1 | 0.1 | 0. |
| 1 (S) | R = 30 | | | | 1.0025 | | 8.4 | 0.1 | 0. |
| 1 (S) | R = 30 | | | | 1.0009 | | 33.6 | 0.1 | 0. |

3. ACCOUNTING FOR THE ATTENUATION BY THE MATERIALS OF THE SAMPLE MATRIX, CONTAINER, GENERIC ABSORBERS, AND ENVIRONMENT.

As it was noted above the collimator attenuation factor is considered as separate term in equation [2.1]. See the collimator attenuation factor discussion in the paragraph 4.

3.1. Compilation the Linear Attenuation Coefficient for a Composite Material

As it well known, the attenuation factor for the gamma-quanta with the energy [E] in any material is computed using the following equation:

$$i\,AT = \exp\{-L*\mu E\}, \quad [3.1.1]$$

where the L is the gamma-quanta path length in material with the linear attenuation coefficient [$\mu E$]. $\mu E$ is computed as the $D*M_E$ product where $M_E$ is the mass attenuation mass attenuation coefficient and the weight fraction of the i-th component respectively.

Because of the [3.1.3] property, the $M_E$ of any composite material can be compiled using the ME of the simple materials. Applying the [3.1.3] property recursively, the $M_E$ of more and more complex materials can be compiled.

3.2. The Linear Attenuation Coefficient [$\mu E$] Function Computation For Humid Air Here is example to compute the $\mu E$ function for humid air at a given pressure [Pa], temperature [Ta] and relative humidity [RH].

The elemental composition and fractions of each element for dry air are: 78.09% N+20.95% O+0.93% Ar+0.03% CO2. The water composition is H2O. The $M_{air}$ [for dry air] and the $M_{water}$ can be computed substituting $M_N$, $M_O$ $M_{Ar}$, $M_C$, and $M_H$ of the simple materials library and the corresponding weight fraction in equations [3.1.2] and [3.1.3].

For dry air, it is first necessary to compute $M_{CO2}$. The $W_C$ and $W_O$ weight fractions in the CO2 material are respectively equal to 0.273 and 0.727. Let's select 20 uniformly distributed [on logarithmic scale] reference points within the desired energy interval [50,2000 kev for example], compute the $M_C$ and $M_O$ values using equation [3.1.2], and sum these values at each of the 20 reference energies using 0.273 and 0.727 as the weight fractions in equation [3.1.3]. The resulting values are approximated by the [3.1.2] type polynomial with the LSQ method and stored in the library as $M_{CO2}$. Now in just the same way we can step by step sum the $M_N$, $M_O$, $M_{Air}$, and $M_{CO2}$ function using respectively 0.7809, 0.2095, 0.0095, and 0.0003 as the weight fractions in equation [3.1.3]. Let's assume that the $M_{air}$ [for dry air] and the $M_{water}$ are already computed.

It is clear that the same algorithm can be applied to compute the M for the humid air using the $M_{air}$ and $M_{water}$. It is only necessary to determine the dry air and water weight fractions in the air-water mixture at the given values of Ta, Pa, and RH.

To do this the following formulas are used. Absolute air humidity [or mass (g) of water in a cu. meter of air] is computed as follows:

$$Dw=0.794*(RH/100.0)*SWSP/(1.0+0.00367*Ta)$$

where the RH and Ta are presented in the % and Celsius degree respectively. The SWSP [in mm.Hg] is the saturated water steam pressure. The SWSP(Ta) function is available in the physical handbook.

To translate Dw from g/cu. meter to kg/cu. meter Dw=Dw/1000.

Partial water pressure [PWP in mm. Hg] is computed as:

$$PWP=0.3783*(RH/100.0)*SWSP*760.0/101325.$$

The air density [in kg/cu.meter] is computed as follows:

$$Da=1.2929*(Pa-PWP)/(1.0+0.00367*Ta)/760$$

The air-water mixture density [Dm in kg/cu.meter] is computed as:

$$Dm=Da+Dw.$$

Water fractional content Wwater=Dw/Dm;
Air fractional content Wair=Da/Dm;
Finally to translate the Dm in g/cu.cm: Dm=Dm/1000.

Now it only remains to calculate the M for humid air like it is done above for dry air and then to calculate "m" for the humid air as the Dm*M product.

3.3. Computation of the Attenuation Path Length Inside Rectangular, Cylindrical and Spherical Shape Objects To compute the $f_{att}(X1,X2,X3)$ value [see equation [2.1]], the problem is to account for all the possible attenuation for the different energy gamma-quanta passing from the sample point [with the X1,X2,X3 coordinates] to the detector reference point. Namely:

$$f_{att}(X1,X2,X3)=\exp\{-\Sigma(L_{Mi}*\mu)-L_C*\mu_C-L_{GA1}*\mu_{GA1}-L_{GA2}*m-L_{GA2}*\mu_C\}_E \quad [3.3.1]$$

where the $L_{Mi}$, $L_C$, $L_{GA1}$, $L_{GA2}$ and $L_E$ are the attenuation path lengths of the energy E gamma-quanta in material of the i-th matrix layer, the container, the 1st and 2nd generic absorber, and the environment [usually humid air] respectively. The $\mu_i$, $\mu_C$, $\mu_{GA1}$, $\mu_{GA2}$ and $\mu E$ are the corresponding linear attenuation coefficients.

Any geometry configuration of the method can be modeled as the composition of the simple shapes of the rectangular parallelepiped, cylinder, sphere, cone, and pyramid [the last two shapes are used to represent collimator openings]. Here the procedure for computation of the path length through objects with these shapes is discussed.

Figure 4:
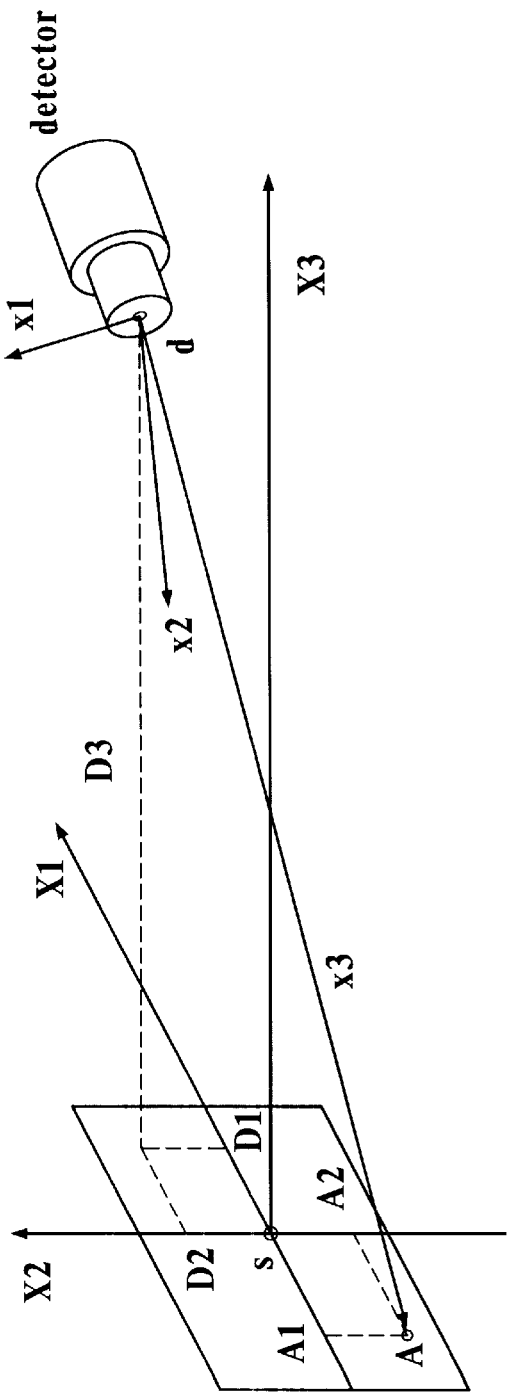
FIG. 4 illustrates the translation between the sample and detector coordinate system.
Figure 5A:
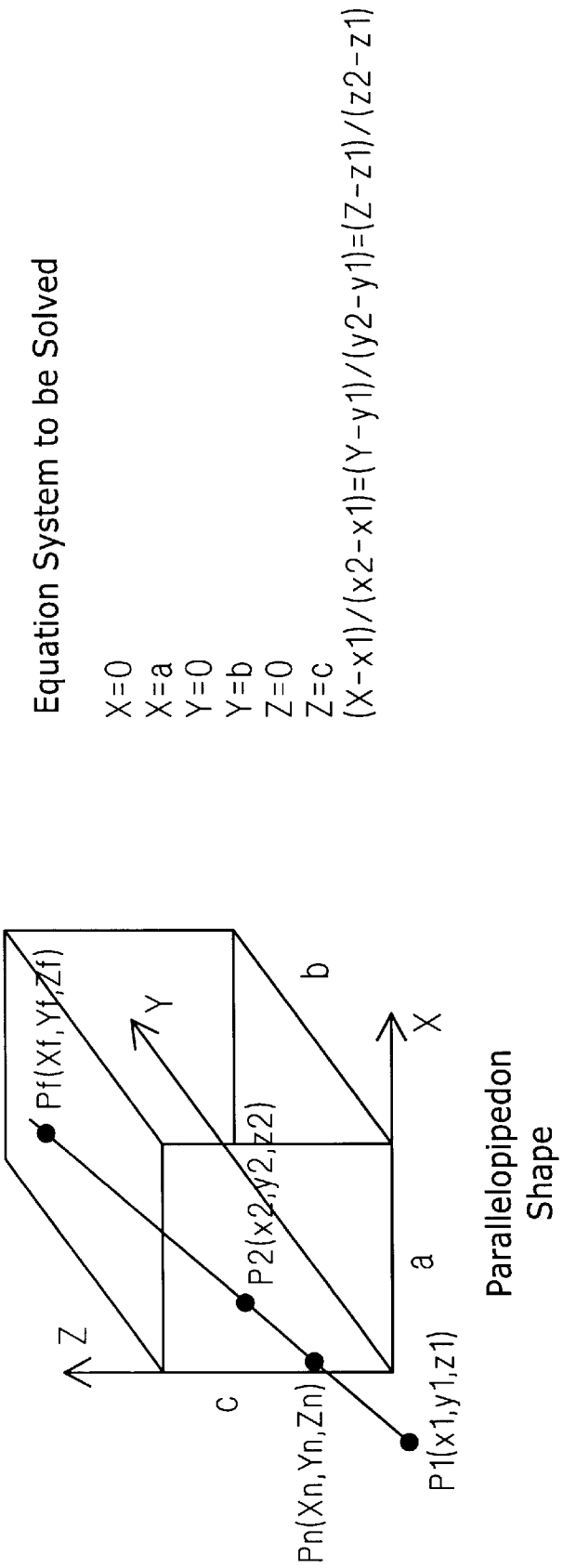
FIG. 5A illustrates the computation of the directional pathway between a point and the detector for a parallelopipedon shape.
Figure 5B:
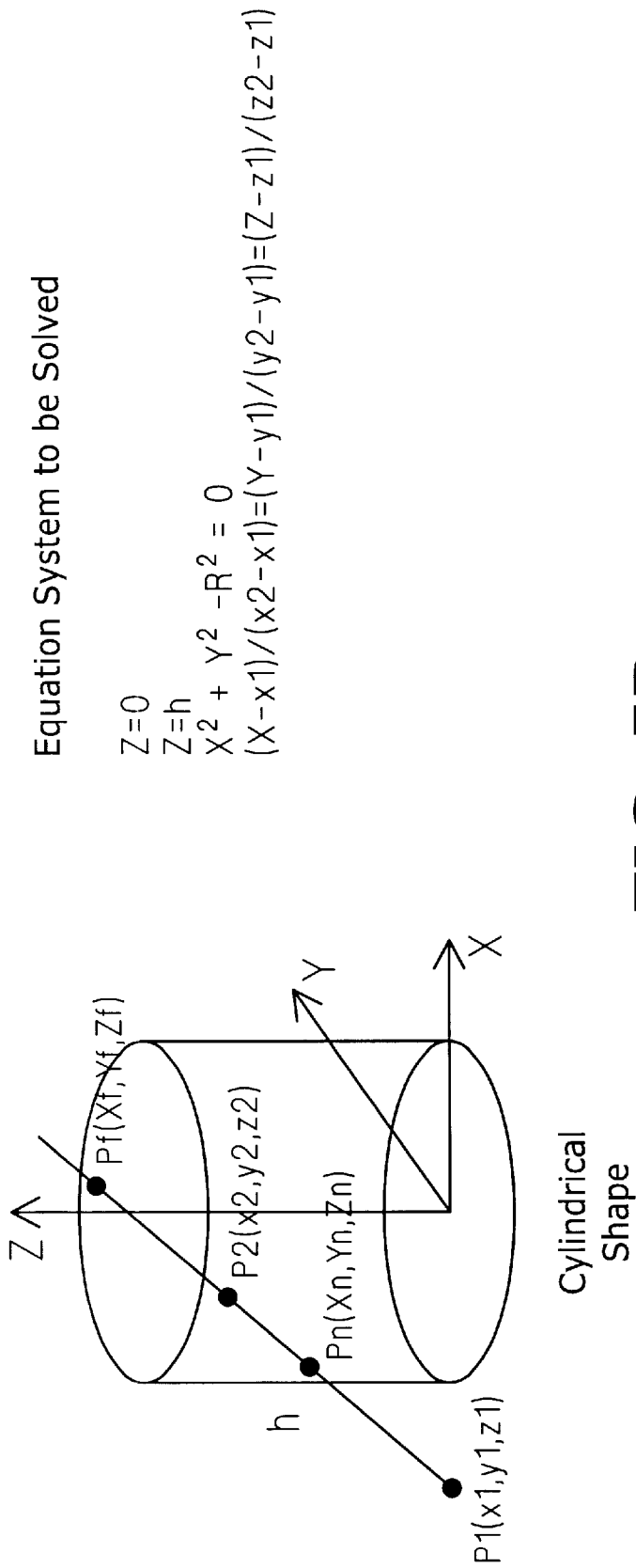
FIG. 5B illustrates the computation of the directional pathway between a point and the detector for a cylindrical shape.
Figure 5C:
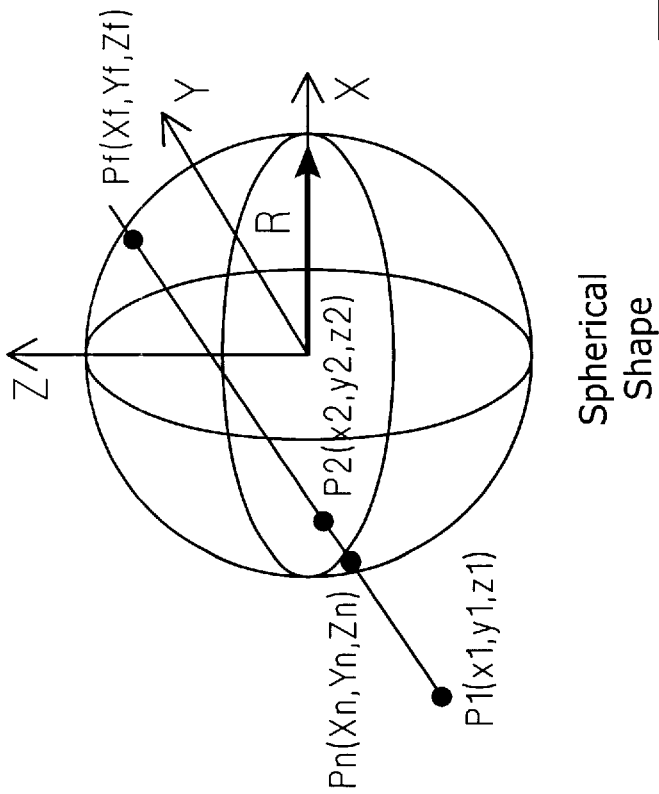
FIG. 5C illustrates the computation of the directional pathway between a point and the detector for a spherical shape.
Figure 5D:
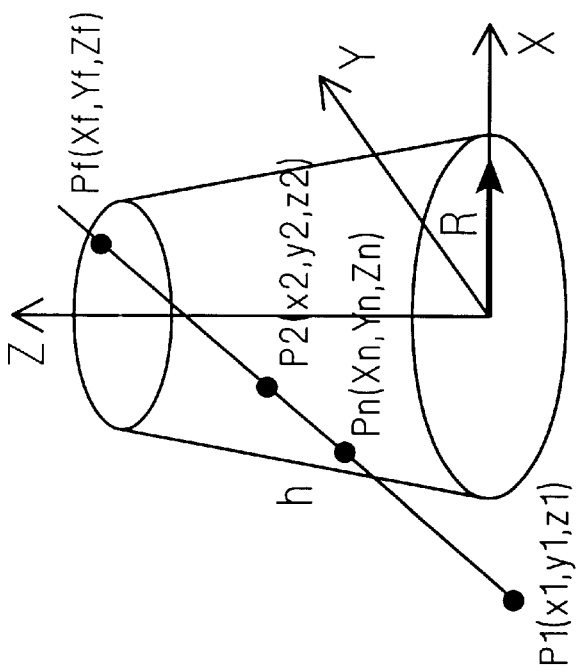
FIG. 5D illustrates the computation of the directional pathway between a point and the detector for a truncated conical shape.
Figure 5E:
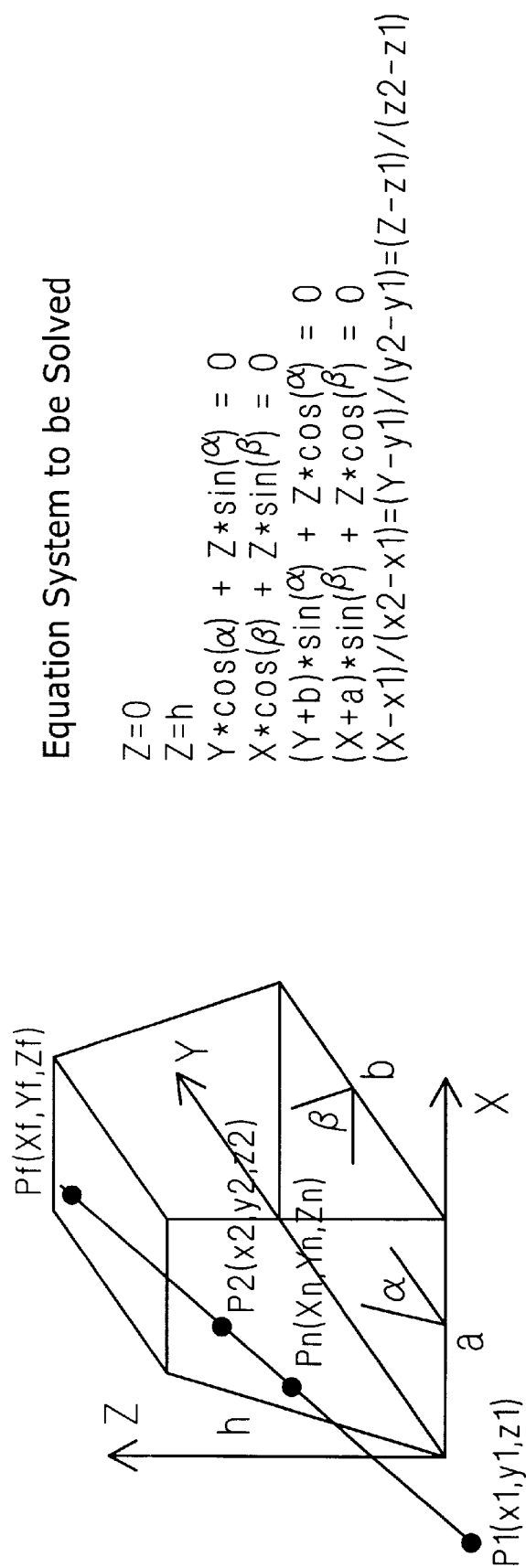
FIG. 5E illustrates the computation of the directional pathway between a point and the detector for a truncated 4-sided pyramidal shape.

Let's denote the sample point and the detector reference point by Ps and Pd respectively. Then the problem can be defined as the determination of the coordinates of points of the PsPd line intersection with the surface of any object. Refer to FIG. 4.

As the method uses two different coordinate systems to determine the sample and detector locations, the following matrix equations are applied to translate back and forth any point coordinates:

for translation to sample coordinates system: $|X|=|D|+T^*|x|$ for translation to detector coordinates system: $|x|=T^*|X-D|$ where the $|X|$ and $|x|$ vectors are the point coordinates in the sample and detector system respectively. The $|D|$ vector is the Pd coordinates in the sample coordinates system. The T orthonormalized matrix [so-called the direction cosines matrix] is determined as follows:

$$T = \begin{vmatrix} \cos(X1, x1)\cos(X1, x2)\cos(X1, x3) \\ \cos(X2, x1)\cos(X2, x2)\cos(X2, x3) \\ \cos(X3, x1)\cos(X3, x2)\cos(X3, x3) \end{vmatrix}$$

where any cos(Xi,xj) is the cosine of the angle between the i-th sample system axis and j-th detector system axis. Only 5 parameters [the 3 coordinates of the vector $|D|$ and the 2 coordinates of the detector axis intersection with the plane of the sample system] are required to determine uniquely the translation matrix T.

Thus if two points are given in different coordinate systems, they can be always represented in the same coordinate system [x,y,z]. And therefore the equation of the line passing through these points [P1(x1,y1,z1) and P2(x2,y2,z2)] can be determined. Refer to FIG. 5 for a graphical description of this process.

The rectangular parallelepiped surface equation can be determined by 6 equations of the planes:
X=0,
X=a,
Y=0,
Y=b,
Z=0,
Z=c,
where the a, b, and c are the edge lengths. 3 of them are coincident, and the others are parallel with the coordinate planes since the origin is located in the front, left corner of the base of a rectangular parallelepiped.

If the origin is located in the center of the base of a cylinder, the surface equation can be determined by the 2 equations of the planes:
Z=0,
Z=h,
and $X^2+Y^2-R^2=0$ cylinder side surface
where h is the cylinder height, and R is the cylinder radius.

If the origin is located in the center of a sphere, the surface equation can be determined as:

$$X^2+Y^2+Z^2-R^2=0,$$

where R is the sphere radius.

If the origin is located in the center of the base of a truncated cone base, the surface equation can be determined by the 2 equations of the planes:

Z=0,
Z=h,
and $X^2+Y^2-Z^2/R^2=0$ cone side surface
where h is the truncated cone height, and R is the cone base radius.

The pyramidal surface equation can be determined by the 6 equations of the planes if the origin is located in the front, left corner of the base of a pyramid:
Z=0,
Z=c,
$Y^*\cos(\alpha)+Z^*\sin(\alpha)=0$,
$X^*\cos(\beta)+Z^*\sin(\beta)=0$,
$(Y+b)^*\sin(\alpha)+Z^*\cos(\alpha)=0$,
$(X+a)^*\sin(\beta)+Z^*\cos(\beta)=0$,
where a and b are the X and Y pyramid base dimensions respectively; c is the truncated pyramid height; $\alpha$ and $\beta$ are the pyramid sides angles to the Y and X axis respectively.

To determine the coordinates of points of the P1P2 line intersection with the surface of any object mentioned above, it is necessary only to find the joint solution of the P1P2 line equation and the appropriate complete of the surface equations. If the solution exists then the P1P2 line intersects the object. And the attenuation path length [L] is computed as:

$$L=\sqrt{(\Delta x)^2+(\Delta y)^2+(\Delta z)^2}$$

where $\Delta x$, $\Delta y$ and $\Delta z$ are the differences between the same name coordinates of the intersection points. If point P1 is located inside the object then $\Delta x$, $\Delta y$ and $\Delta z$ are the differences between the same named coordinates of the P1 and intersection point which is nearest to point P2 [P2 must be located outside the object].

The L values computed as described are substituted in equation [3.3.1] to determine the $f_{att}(X1,X2,X3)$ attenuation factor for the specified point [X1,X2,X3] of the sample. Similar computations are done for each specified point of the sample during integration of the volume efficiency.

4. THE COLLIMATOR ATTENUATION FACTOR FOR A POINT OF SAMPLE

Figure 6:
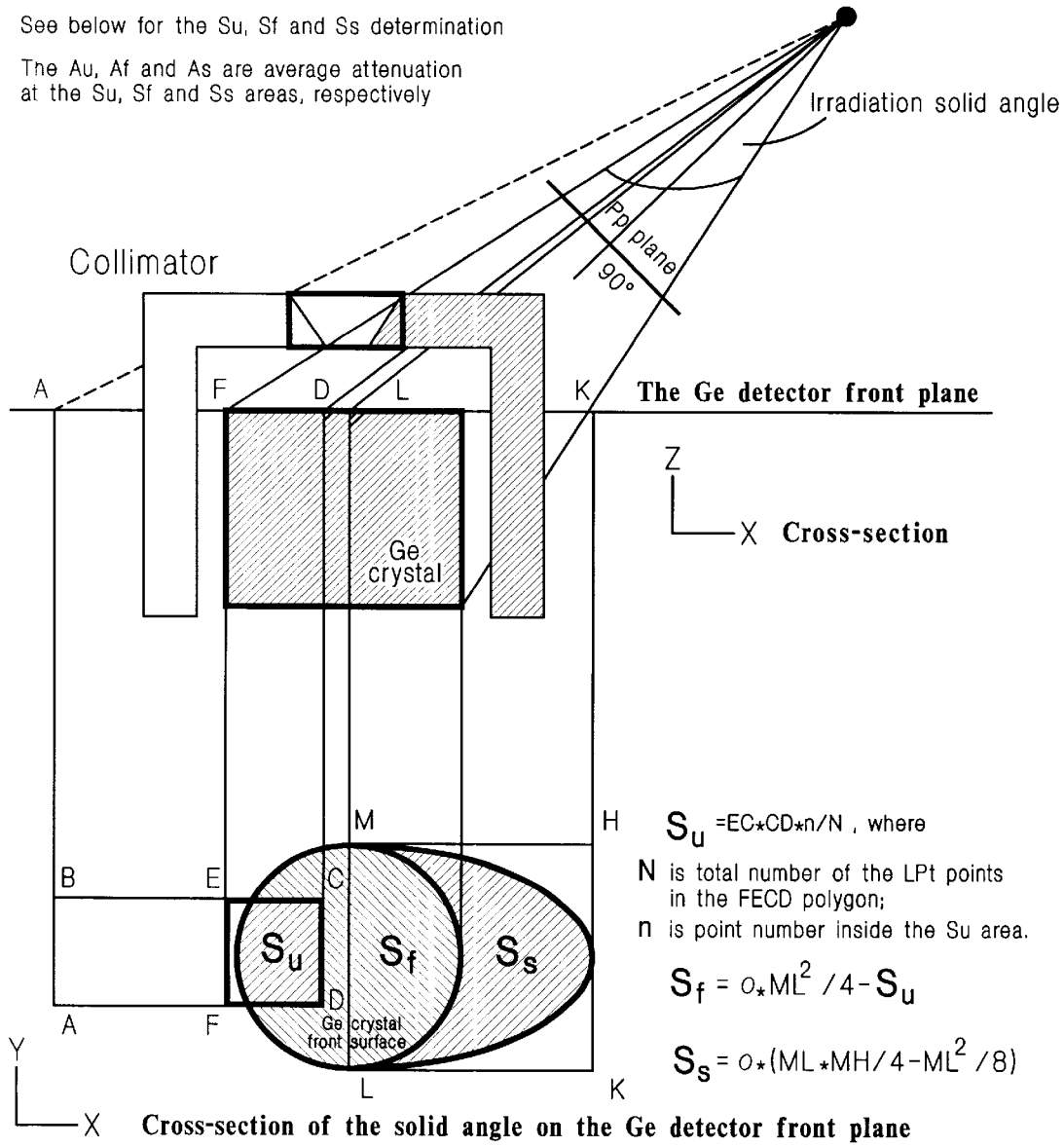
FIG. 6 illustrates the collimator attenuation factor computation.

The problem of accounting for the collimator attenuation factor is not so trivial like in the case of the matrix, container, generic absorbers, and the environment materials. Since the collimator has a front opening, it is necessary to properly account for the part of the gamma-quanta passing through this opening without attenuation. In FIG. 6, the interaction of radiation from a point source with a detector surrounded by a collimator is schematically presented.

The collimator attenuation factor is assumed as the average attenuation along the uniformly distributed pathways going inside the solid angle which top is located at the specified sample point and the base of this angle is located in the plane of the detector front. Three different areas inside the solid angle base are distinguished:
the opening umbra [Su] inside the detector front surface
the detector front surface [Sf] without any opening umbra
the projection [Ss] of the detector side which is visible from the solid angle top.

The uniform distribution is simulated separately on each area of the Su, Sf, and Ss located on the plane of the detector front [Pdf]. Then the average attenuation [Au, Af, and As] of the pathways going through the each mentioned area is computed. The found Au, Af, and As are weighted taking into account the Su, Sf, and Ss area size respectively to find the each area contribution in the total attenuation factor [At]. But since the Su, Sf, and Ss are required to be located in a plane [Pp] aimed to be perpendicular to the irradiation solid angle, the Su, Sf, and Ss should be corrected respectively by the Ku, Kf, and Ks proportionality coefficients taking into account the difference between a unit area on the Pdf plane and its projection on the Pp plan. In other words, to find the real total number of the quanta going through the Su, Sf, and Ss areas it is necessary to use the Su*Ku, Sf*Kf, and Ss*Ks products instead of the Su, Sf, and Ss values respectively. Where Ku=Su/(Su)', Kf=Sf/(Sf)', and Ks=Ss/(Ss)'. And the (Su)', (Sf)', and (Ss)' are respectively the projections of the Su, Sf, and Ss on the Pp plane.

It is important to note, that it is not required to find the exact outline of the opening umbra. In the case of a cone [or cylinder] it is an ellipse which is not a suitable shape as is a rectangle [or circle] to simulate the uniform distribution. Thus the umbra of the minimum size rectangular parallelepiped completely including the opening volume is found [it doesn't matter if the opening is a cone, or a cylinder, or any parallelepiped or something else]. As long as the umbra of the rectangular parallelepiped is a rectangle, it is easy to simulate uniformity.

When the [N] points uniformity is simulated in the rectangle area, each simulated point is checked if it belong to the detector front surface. So, only the [n] points belonging to the Ge detector front surface are used. Now, to find the area of the rectangle belonging to the detector front surface [Su], it is simply necessary to use the Sr*n/N ratio, where the Sr is the rectangle area. Since as the ratio of the ellipse area to the area of the rectangle circumscribing this ellipse is approximately the 0.75, the same number of the LPτ-points can always be used [doesn't matter the opening size and shape]. This is a very useful property of this method. If the location and size of the opening umbra could not be estimated, the problem would be unsolvable for the case of small opening, since it would require a very large number of points to be distributed uniformly on the Ge detector front surface to accurately "see" the opening umbra. It is easy to compute how many points are needed in this direct [non-intellectual] solution. Let's assume that the opening umbra is approximately 1 cm2 and the detector front surface is 40 cm2. If to compute the average attenuation of the opening, N uniformly distributed points are used, then the number of points for the direct solution is 40N. That is forty times more than for the method described above.

To compute the average attenuation [Af] for the detector front which isn't occupied by the opening umbra, the reference points are distributed in the circular surface of the detector front. Now, the points belonging to the opening umbra are not used. Here, only a few reference points [10–20] are needed to compute the average attenuation, because the attenuation factor in this area of the detector front is approximately the same order for all points, unlike the opening umbra area.

The detector front surface without any opening umbra [Sf] is computed as the remainder after subtraction the opening umbra area from the detector front total area [Sf=Sdet-Su].

Finally, the average attenuation [As] for the detector side projection [Ss] is computed using uniformly distributed reference points over the side projection area. The minimum size rectangle including the ellipsoidal projection [Ss] is found. Then [N] LPτ-points are generated on the rectangle area [Srs]. Each LPt point is connected with the sample point to determine the pathway direction. To determine the As and Ss only [n] pathways going through the Ge detector side are taken into account. Then Ss is calculated as Ss=Srs*n/N like it was done in case the Su.

The average Ku, Kf, and Ks proportionality coefficients are computed simultaneously with the computation of the average attenuation [Au, Af, and As] in the following way:

$$Au = \left[\sum_1^{Nu} Au(i)\right] \bigg/ \left[\sum_1^{Nu} Ku(i)\right], \quad Af = \left[\sum_1^{Nf} Af(i)\right] \bigg/ \left[\sum_1^{Nf} Kf(i)\right], \quad [4.1]$$

$$As = \left[\sum_1^{Ns} As(I)\right] \bigg/ \left[\sum_1^{Ns} Ks(I)\right]$$

$$Ku = \left[\sum_1^{Nu} Ku(i)\right] \bigg/ Nu, \quad Kf = \left[\sum_1^{Nf} Kf(i)\right] \bigg/ Nf,$$

$$Ks = \left[\sum_1^{Ns} Ks(i)\right]$$

where the Nu, Nf, and Ns are the numbers of the tested pathways going through the Su, Sf, and Ss areas respectively.

The Nu points number may be changed by user via the CRPN parameter [CRPN is an abbreviation for 'Collimator Reference Points Number'], where CRPN is the power of 2 used in the following formula:

$$Nu = 2^{CRPN} - 1 \quad [4.2].$$

The CRPN value may be selected from 4 to 10. The minimum number of points is 15 and the maximum is 1023.

But this points number is applied only for the Su area, because only here the nonhomogenity of the attenuation factor is expected. As it was seen from preliminary tests, the good convergence of the attenuation factor in the Su area can be achieved usually at the CRPN=7 for small size openings [~1 cm$^2$] and at 50 kev energy. Of course for 7000 kev energy, convergence is achieved faster. Also, convergence is achieved faster with larger opening sizes.

For the Sf area the points number [Nf] varies as:

$$Nf = Nu * Sf / Sdet,$$

where Sdet is the total area of the Ge detector front surface. So, if the Sf/Sdet decreases, the Nf also decreases.

For the Ss the fixed number of points is applied [Ns=31]. This seems to be quite enough taking into account that usually the detector side is completely either shielded or unshielded.

Finally, the total attenuation factor [At] is computed as follows:

$$At = (Su*Ku*Au + Sf*Kf*Af + Ss*Ks*As)/(Su*Ku + Sf*Kf + Ss*Ks) \quad [4.3].$$

Similar computations are done for each specified point of the sample during integration of the volume efficiency.

OTHER PUBLICATIONS

1. H. L. Beck, J. DeCampo and C. V. Gogolak, "In Situ Ge(Li) and NaI(T1) Gamma-Ray Spectrometry", USDOE Report HASL-258, 1972.
2. N. A. Chieco, D. C. Bogen and E. O. Knudsen (eds.), "EML Procedures Manual", USDOE Report, HASL-300, 27th edition, Vol. 1, Section 3, 1992.
3. I. K. Helfer and K. M. Miller, Health Physics, 55 (1988) 15.
4. D. Reilly, N. Ensslin, H. Smith, Jr. and S. Kreiner (eds.), "Passive Nondestructive Assay of Nuclear Materials", USNRC, NUREG/CR-5550, 1991.
5. P. Filss, Appi. Radiat. Isot. 46 (1995) 805.
6. L. Moens, J. De Donder, Lin Xi-Lei, F. De Corte, A De Wispelaere, A. Simonits and J. Hoste, Nucl. Instr. Meth. 187 (1981) 451.
7. M. Noguchi, k. Takeda and H. Higuchi, Int. J. Appl. Radiat. Isot. 32 (1981) 17.
8. V. V. Atrashkevich and V. P. Kolotov, J. Radioanal. Nucl. Chem. 169 (1993) 397.
9. I. M. Sobol' and R. B. Statnikov, "The Selection of Optimum Parameters to Solve the Tasks with Many Criteria", Nauka Press, Moscow, 1981 (in Russian).
10. H. Aaltonen, S. Klemola and F. Ugletveit, Nucl. Instr. Meth. A339 (1994) 87.
11. D. W. O. Rogers, Nucl. Instr. Meth. 199 (1982) 531.
12. K Debertin and B. Grosswendt, Nucl. Instr. Meth. 203 (1982) 343.
13. T. Nakamura and T. Suzuki, Nucl. Instr. Meth. 205 (1983) 211.
14. S. Kamboj and B. Kahn, Health Physics 70 (1996) 512.
15. F. Bronson and L. Wang, "Validation of the MCNP Monte Carlo Code for Germanium Detector Efficiency Calibrations", Proceedings of Waste Management 96, February 1996, Tucson, Ariz.

What is claimed is:

1. A method of calibrating and using a radiation detector to measure radioactivity of a radioactive object, comprising:
    (a) characterizing said detector by defining a plurality of efficiency calibration point locations in an environment around said detector;
    (b) providing a calibration source with at least one energy at each of said efficiency calibration point locations;
    (c) dividing said efficiency calibration point locations into at least one characterization region around said detector;
    (d) determining efficiency at each of said calibration point locations for each said at least one energy;
    (e) providing at least one detector characterization equation describing absolute efficiency as a function of energy, angle, and distance from said detector;
    (f) comparing shape of said radioactive object to a variety of models with standard sample shapes, selecting a model with shape similar to said shape of said radioactive object, and inputting to said model all necessary parameters to describe the composition and location of at least one radioactive source region within said model, inputting to said model location and composition of all attenuating materials, and inputting to said model detector location and its orientation with respect to said at least one radioactive source region;
    (g) dividing said at least one radioactive source region into a large number of voxels;
    (h) defining a location of a specific point within each of said large number of voxels;
    (i) determining efficiency at locations of specific points using said at least one detector characterization equation described in step (e);
    (j) repeating steps (h) through (i) for all said large number of voxels at a specific energy;
    (k) when said model comprises multiple radioactive source regions, repeating steps (g) through (j) and summing the data for each multiple radioactive source region in proportion to a specified relative concentration of radioactivity in each of said multiple radioactive source regions;
    (l) repeating steps (g) through (k) for all necessary energies to compute a final efficiency for each of said necessary energies;

(m) using said computed final efficiencies to efficiency calibrate said detector; and (n) using said efficiency calibrated detector to measure radioactivity of said radioactive object.

2. A method, as defined in claim 1, wherein: step (b) includes employing a Monte Carlo technique to calculate efficiency at each of said efficiency calibration point locations, without radioactive sources.

3. A method, as defined in claim 1, wherein: step (a) includes employing LPT sequences to determine said efficiency calibration point locations.

4. A method, as defined in claim 1, wherein: step (c) includes selectively locating each of said at least one characterization region anywhere in a volume surrounding said detector.

5. A method, as defined in claim 1, wherein: step (c), when said at least one characterization region comprises more than one region, includes minimizing discontinuities at the boundaries between said at least one characterization region and any other characterization region(s).

6. A method, as defined in claim 1, wherein: step (g) includes providing said voxels having identical sizes.

7. A method, as defined in claim 1, wherein: step (g) includes providing at least some of said voxels having different sizes.

8. A method, as defined in claim 1, wherein: step (h) includes employing an LPT sequence method to determine locations of specific points in said voxels.

9. A method, as defined in claim 1, further comprising: calculating attenuation correction factors due to sources and non-sources between said at least one voxel and said detector by computing path lengths between said point and said detector, determining all materials comprising said path length including other source voxels, non-source region materials including source region container, and including any air, corrected for temperature, barometric pressure, and relative humidity, by evaluating elemental combination and chemical formulae and then computing attenuation factors for all said materials, and applying said attenuation correction factors to the output of step j of claim 1.

10. A method, as defined in claim 1, further comprising:

(a) determining an effective collimator attenuation correction factor by using a plurality of rays between a voxel point and various portions of said detector; and (b) repeating step 10(a) in step (j) of claim 1.

11. A method, as defined in claim 10, further comprising: employing an LPT sequence to determine directions of intersection of said rays with said detector.

12. A method, as defined in claim 10, further comprising: intersecting said rays with at least a front and a side of said detector.

\* \* \* \* \*